United States Patent
Fujino et al.

(10) Patent No.: US 9,066,313 B2
(45) Date of Patent: Jun. 23, 2015

(54) BASE STATION, RADIO COMMUNICATION SYSTEM, AND COMMUNICATION METHOD

(75) Inventors: Kosuke Fujino, Tokyo (JP); Kazunori Obata, Tokyo (JP); Seigo Harano, Tokyo (JP); Tadashi Uchiyama, Tokyo (JP); Hiroyuki Ishii, Tokyo (JP); Naoto Ookubo, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 142 days.

(21) Appl. No.: 13/885,689

(22) PCT Filed: Dec. 21, 2011

(86) PCT No.: PCT/JP2011/079739
§ 371 (c)(1),
(2), (4) Date: May 16, 2013

(87) PCT Pub. No.: WO2012/086732
PCT Pub. Date: Jun. 28, 2012

(65) Prior Publication Data
US 2013/0237224 A1 Sep. 12, 2013

(30) Foreign Application Priority Data

Dec. 24, 2010 (JP) ................................. 2010-288683

(51) Int. Cl.
*H04W 60/00* (2009.01)
*H04W 76/06* (2009.01)
(Continued)

(52) U.S. Cl.
CPC .............. *H04W 60/00* (2013.01); *H04W 72/00* (2013.01); *H04W 88/08* (2013.01); *H04W 36/22* (2013.01); *H04W 76/066* (2013.01); *H04W 84/045* (2013.01); *H04W 28/0205* (2013.01)

(58) Field of Classification Search
USPC ................................ 455/435.1, 424; 370/252
See application file for complete search history.

(56) References Cited

U.S. PATENT DOCUMENTS

| 2004/0125800 A1 | 7/2004 | Zellner |
| 2012/0178439 A1* | 7/2012 | Vashi et al. ................... 455/424 |
| 2013/0171991 A1* | 7/2013 | Fujino et al. ............... 455/435.1 |

FOREIGN PATENT DOCUMENTS

| JP | 2010-263513 A | 11/2010 |
| WO | 2009/149431 A1 | 12/2009 |

OTHER PUBLICATIONS

Extended European Search Report issued in counterpart European Application No. 11852083.2 mailed Aug. 7, 2014 (9 pages).
(Continued)

*Primary Examiner* — Diane Mizrahi
(74) *Attorney, Agent, or Firm* — Osha Liang LLP

(57) ABSTRACT

A base station includes a connection processing unit that performs connection processes between user terminals registered in a user terminal registration unit and the base station, and between user terminals other than the user terminals registered in the user terminal registration unit and the base station; a resource amount measurement unit that measures an amount of resources utilized by the base station; and a call disconnection user terminal selecting unit that selects, when the resource amount measurement unit measures that the amount of the resources is greater than or equal to a predetermined threshold value, the user terminal for which a call is to be disconnected, among the user terminals other than the user terminals registered in the user terminal registration unit. The connection processing unit disconnects a connection with the user terminal for which the call is to be disconnected.

6 Claims, 13 Drawing Sheets

(51) Int. Cl.
*H04W 28/02* (2009.01)
*H04W 72/00* (2009.01)
*H04W 88/08* (2009.01)
*H04W 36/22* (2009.01)
*H04W 84/04* (2009.01)

(56) References Cited

OTHER PUBLICATIONS

Office Action issued in corresponding Japanese Application No. 2010-288683, mailed Aug. 6, 2013 (7 pages).

International Search Report issued in PCT/JP2011/079739 mailed Jan. 24, 2012 (4 pages).

Written Opinion issued in PCT/JP2011/079739 mailed Jan. 24, 2012 (3 pages).

Alcatel-Lucent, et al.; "Congested H(e)NB Hybrid Access Mode cell"; 3GPP TSG-RAN WG3 Meeting #64, R3-091053; San Francisco, U.S.A.; May 4-8, 2009 (4 pages).

3GPP TR 36.921 V9.0.0; "3rd Generation Partnership Project; Technical Specification Group Radio Access Network; Evolved Universal Terrestrial Radio Access (E-UTRA); FDD Home eNode B (HeNB) Radio Frequency (RF) requirements analysis (Release 9)"; Mar. 2010 (45 pages).

* cited by examiner

BASE STATION, RADIO COMMUNICATION SYSTEM, AND COMMUNICATION METHOD

CROSS-REFERENCE TO RELATED APPLICATIONS

The present application claims priority based on Japanese Patent Application No. 2010-288683, filed on Dec. 24, 2010, the entire contents of which are hereby incorporated by reference.

BACKGROUND OF INVENTION

1. Technical Field

The present invention relates to a radio communication system.

2. Background Art

Technical specifications of Long Term Evolution (LTE) have been developed by the 3rd Generation Partnership Project (3GPP), which is the standardization organization of the Wideband-Code Division Multiple Access (W-CDMA). LTE is a standard that is further evolved from the High Speed Packet Access (HSPA), which is evolved technology of the W-CDMA. LTE provides high-speed communications, where a downlink transmission rate of 100 Mbps or more is achieved, and an uplink transmission rate of 50 Mbps or more is achieved. LTE improves latency and spectral efficiency.

For LTE, similar to 3G, it is considered to provide a micro base station as a method of establishing a communication area in a home or in a small store.

For example, an LTE femto radio base station (hereinafter, referred to as "the femto base station") is placed on a steel tower or on a roof of a building, besides in a home or a small store. The femto base station has a limited call area having a radius of approximately several tens of meters.

RELATED ART DOCUMENT

Non-Patent Document

Non-Patent Document 1: 3GPP TR 36.921 V9.0.0 (7.5 Hybrid Cells) 2010 March

SUMMARY OF THE INVENTION

It is considered to introduce a cell that is covered by a femto base station in a manner like a hot spot (hereinafter, which is referred to as "the femtocell") in an area where another cell that is covered by a normal base station (hereinafter, referred to as "the macrocell") is formed, for example.

Additionally, for LTE, it is considered to introduce hybrid cells (HeNBs: Hybrid Cells) (cf. Non-Patent Document 1, for example). In the hybrid cell, in addition to a user group having rights to access the hybrid cell (Closed Subscriber Group (CSG) members), access rights are granted to a user group not having the rights to access the hybrid cell. Namely, in the hybrid cell, the CSG members and the non-CSG members co-exist. A base station that forms a hybrid cell is not limited to a normal base station. It is possible that a femto base station forms the hybrid cell.

However, for a femto base station, allocatable resources are limited, compared to a normal base station (which is also referred to as "a macro base station). Accordingly, for a case where the hybrid cell is operated by the femto base station, occasions increase where resources become tight, compared to a case where the hybrid cell is not operated, and even for CSG member user terminals (user equipment), resources may not be efficiently allocated. As a result of this, throughputs of the corresponding CSG member user terminals (user equipment) are lowered.

Further, in a state where resources are tight, it is possible that a call connection is not established, even if the user terminal (user equipment) requesting the connection is a CSG member. As a result of this, a phenomenon occurs where, even for a CSG member user terminal (user equipment), various types of services such as a voice call and packet communication may not be provided. It is not preferable for an operator providing the hybrid cell that a call of a CSG member user terminal (user equipment) not be connected due to a non-CSG member user terminal (user equipment) being in communication.

The present invention has been achieved in view of the above-described issues. An objective of the present invention is to ensure resources for registered user terminals (user equipment), when a base station is set to be accessible from registered user terminals (user equipment) and from unregistered user terminals (user equipment).

The base station is a base station that performs radio communications with a user terminal (user equipment). The base station includes a user terminal registration unit that registers first user terminals (user equipment); a connection processing unit that performs connection processes between the first user terminals (user equipment) registered in the user terminal registration unit and the base station, and between second user terminals (user equipment) other than the first user terminals (user equipment) registered in the user terminal registration unit and the base station; a resource amount measurement unit that measures an amount of resources utilized by the base station; and a call disconnection user terminal selecting unit that selects, when the amount of the resources utilized by the base station is measured to be greater than or equal to a predetermined threshold value, the second user terminal (user equipment) for which a call is to be disconnected, among the second user terminals (user equipment) other than the first user terminals (user equipment) registered in the user terminal registration unit. The connection processing unit disconnects a connection with the second user terminal (user equipment) for which the call is to be disconnected, the second user terminal (user equipment) being selected by the call disconnection user terminal selecting unit.

The communication method is a communication method of a base station that performs radio communications with a user terminal (user equipment). The communication method includes a user terminal registration step of registering first user terminals (user equipment); a connection processing step of performing connection processes between the first user terminals (user equipment) registered in the user terminal registration unit and the base station, and between second user terminals (user equipment) other than the first user terminals (user equipment) registered in the user terminal registration unit and the base station; a resource amount measurement step of measuring an amount of resources utilized by the base station; a call disconnection user terminal selecting step of selecting, when the amount of the resources utilized by the base station is measured to be greater than or equal to a predetermined threshold value, the second user terminal (user equipment) for which a call is to be disconnected, among the second user terminals (user equipment) other than the first user terminals (user equipment) registered in the user terminal registration unit; and a call disconnecting step of disconnecting a connection with the second user terminal (user equipment) for which the call is to be disconnected, the second user terminal (user equipment) being selected by the call disconnection user terminal selecting step.

According to disclosed embodiments, when the base station is set to be accessible from the registered user terminals (user equipment) and from the unregistered user terminals (user equipment), the resources can be ensured for the registered user terminals (user equipment).

DETAILED DESCRIPTION

A configuration for implementing the present invention is explained based on the embodiment below, while referring to the figures.

In all the figures for explaining the embodiment, the same symbols are attached to elements having the same functions, thereby omitting repeated explanations.

First Embodiment

<System>

There is explained an environment to which a micro base station and a base station (a macro base station) according to the embodiment are applied.

The environment to which the micro base station and the base station are applied may be an environment where plural mobile communication systems co-exist. LTE may be included in the mobile communication systems. Further, a next generation radio communication system of LTE, such as LTE-Advanced (LTE Rel. 10 and beyond), may be included.

One or plural cells are included in an area covered by the base station. In the plural cells, there are cells in which radio communications are enabled at the same frequency band.

Figure 1:
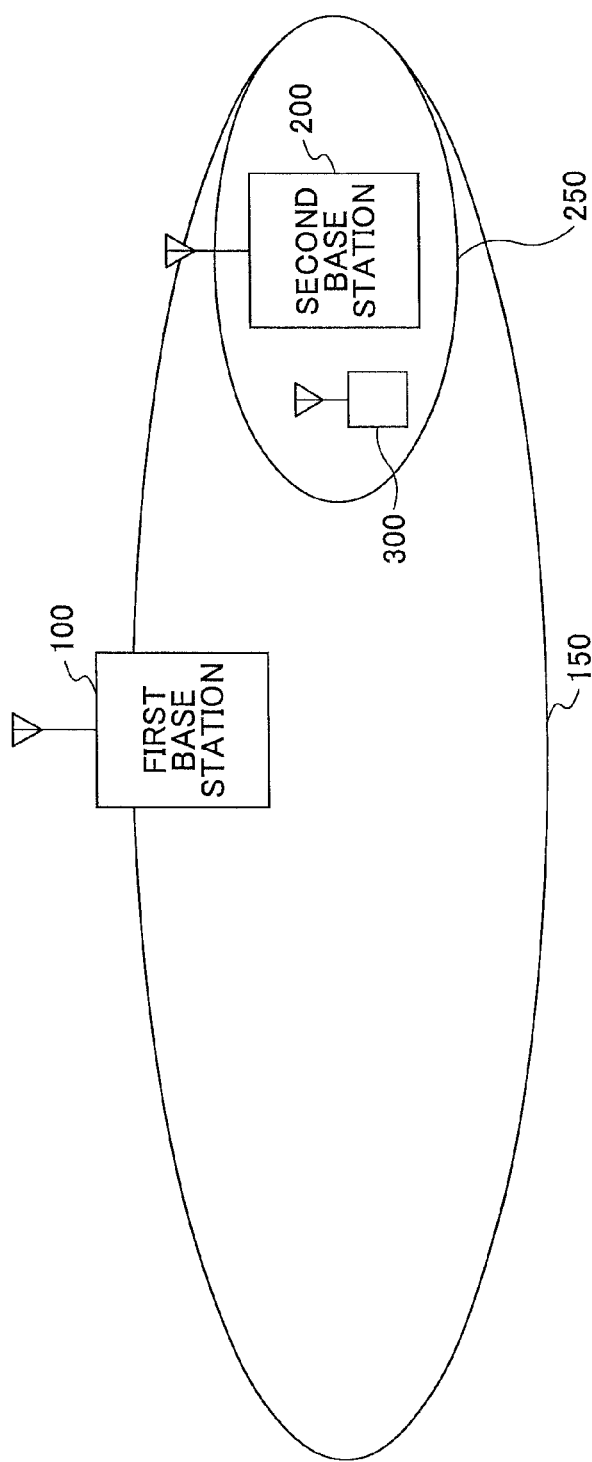
FIG. 1 is a diagram showing an example of a system according to an embodiment.

FIG. 1 shows an example of the environment to which the micro base station and the base station are applied. In FIG. 1, as an example, there are shown a first base station 100 as a base station conforming to the LTE scheme and an area covered by the first base station 100. The area includes a cell in which radio communications with a user terminal (UE: User Equipment) are enabled. A second base station 200 as a micro base station is included in the area 150. The second base station 200 may be a femto base station or a base station that covers a pico-cell (a pico base station). In the embodiment, as an example, a case is explained where the second base station 200 is a femto base station.

From a viewpoint of covering a range difficult for radio waves from the first base station 100 to reach, a location at which the second base station 200 is disposed is preferably within the area covered by the first base station 100. For example, the second base station 200 may be disposed indoor. Specifically, the second base station 200 may be disposed inside a structure, such as a building, or the second base station 200 may be disposed in a house or a small store. Specifically, the second base station 200 may be disposed on a steel tower or on a roof of a building. A portion of the area covered by the first base station 100 may overlap with at least a portion of the area covered by the second base station 200. By overlapping the portion of the area covered by the first base station 100 with at least the portion of the area covered by the second base station 200, a blind zone may be reduced. The second base station 200 covers an area 250. A user terminal (user equipment) 300 is located in the area 250. The user terminal 300 may perform wireless communication through the second base station 200. The user terminal 300 may have an access right to access the second base station 200, or the user terminal 300 may not have the access right.

The first base station 100 and the second base station 200 are connected to a switching center (not shown). The switching center is connected to a core network (not shown). The user terminal (user equipment) 300 performs communication with the first base station 100 or the second base station 200 based on the LTE scheme. The first base station 100 and the second base station 200 may be connected to an evolved packet core (EPC: Evolved Packet Core) (not shown).

<First Base Station>

The first base station 100 performs at least operations of a first mobile communication system (LTE). The first base station 100 may be referred to as an access point AP. The first base station 100 may perform processes of a second mobile communication system (3G), in addition to those of the first communication system (LTE). The first base station (eNB: eNodeB) 100 in the first mobile communication system (LTE) performs, for example, radio resource management, IP header compression and encryption, routing of user traffic, and scheduling of paging messages and broadcast information. The cell covered by the first base station 100 is also referred to as a "macro cell."

Systems to which the embodiment is applied are not limited to the systems based on the LTE scheme and the UTRA scheme, and the systems may be other systems. For example, the present invention may be applied to systems based on the GERAN (GSM) scheme, the CDMA 2000 scheme, and the UMTS scheme, and to fourth generation mobile communication systems.

<Second Base Station>

The second base station 200 forms a hybrid cell. In the hybrid cell, in addition to a user group having rights to access the hybrid cell (Closed Subscriber Group (CSG) members), access rights are also granted to a user group not having the rights to access the hybrid cell (non-CSG members). In order to make user terminals (user equipment) belong to a user group having the access rights, identifiers of the user terminals (which are to belong to the user group) may be registered in advance. Namely, in the hybrid cell, the CSG members (hereinafter, referred to as "registered user terminals") and the non-CSG members (hereinafter, referred to as "unregistered user terminals") co-exist.

The second base station 200 determines as to whether a call connection is to be established for the user terminal 300 which newly makes a call connection request, depending on an amount of resources that can be assigned by the second base station 200 (hereinafter, which is referred to as "the amount of allocated resources"). Here, the amount of allocated resources includes radio resources and resources such as parameters required for connection control. Other elements may be included. In the embodiment, a case is mainly explained where an amount of allocatable radio resources (hereinafter, which is referred to as "the amount of the allocated radio resources") is adopted as an example of the allocated resources. A case is the same where resources other than the amount of the allocated radio resources are adopted.

The second base station 200 determines as to whether the call connection is to be established for the user terminal 300 that newly makes the call connection request, depending on an amount of the allocated radio resources of the second base station 200. Here, the amount of the allocated radio resources may be the total of the amount of the radio resources allocated to user terminals currently connected, or the amount of the allocated radio resources may be an amount of remaining radio resources obtained by subtracting the total of the amount of the radio resources allocated to the user terminals currently connected from the amount of the radio resources that can be used by the second base station 200. As to what amount is to be the amount of the allocated radio resources may be suitably selected. In the embodiment, as an example, a case is explained where the amount of the allocated radio resources is the total of the radio resources allocated to the user terminals currently connected.

The radio resources includes, for example, a channel quality indicator (CQI) resource utilization rate, a scheduling request (SR: Scheduling Request) resource utilization rate, a sounding reference signal (SRS: Sounding Reference Signal) resource utilization rate, a baseband (BB: Base Band) utilization rate, and transmission power.

The CQI is an indicator representing communication quality. The scheduling request is a signal that is transmitted by a user terminal for requesting allocation of radio resources to a base station. The sounding reference signal is a pilot signal. The transmission power includes PHICH transmission power. The PHICH is a channel for transmitting ACK/NACK of HARQ.

The resources other than the radio resources include a CPU utilization rate and a transmission path utilization rate.

<Call Acceptance Determination Method (Version 1)>

A threshold value of the amount of the radio resources (hereinafter, referred to as "the radio resource amount threshold value") is defined for the second base station 200. Here, the radio resource amount threshold value may be an amount of the radio resources for a case where the call connection request is determined not to be accepted, or the radio resource amount threshold value may be an amount of the radio resources that is obtained by adding a predetermined margin to the amount of the radio resources or by subtracting a predetermined margin from the amount of the radio resources. The target of the call connection may be a registered user terminal, an unregistered user terminal, or both the registered user terminal and the unregistered user terminal. From a viewpoint of limiting calls from the unregistered user terminal, the target for performing the call connection is preferably the unregistered user terminal, or both the unregistered user terminal and the registered user terminal.

Figure 2:
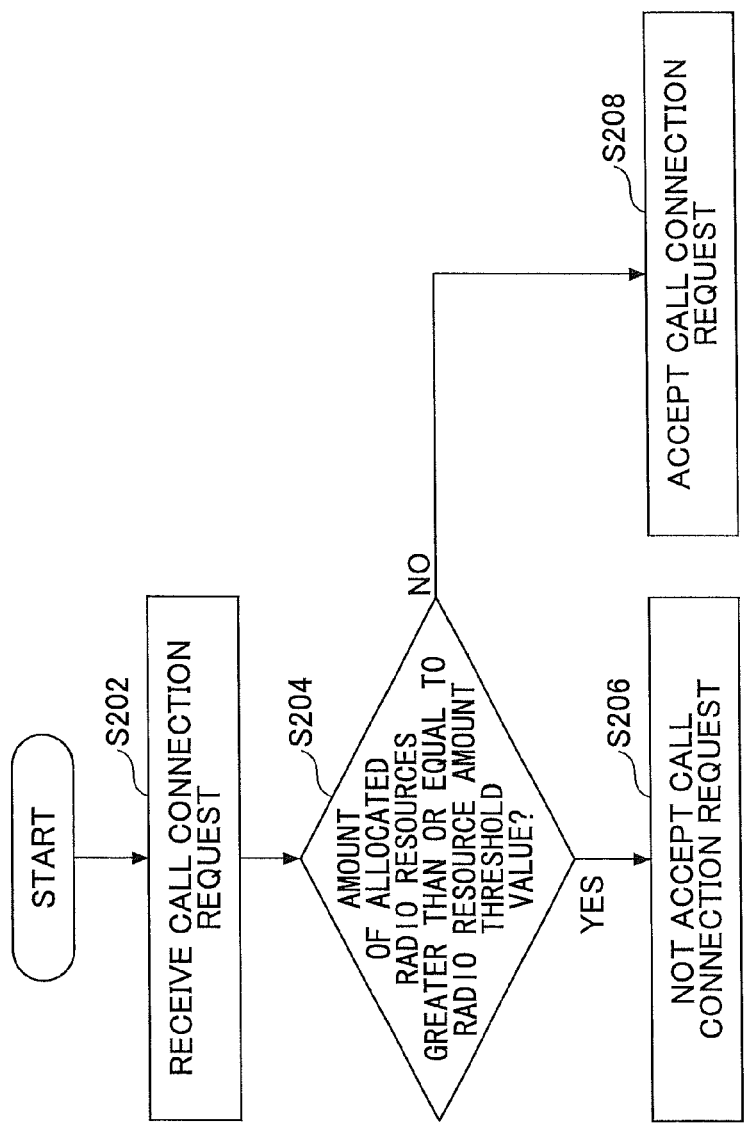
FIG. 2 is a flowchart showing a call acceptance determination method (version 1) according to the embodiment.

FIG. 2 is a flowchart showing the call acceptance determination method (version 1).

The second base station 200 receives a call connection request from the user terminal 300 (step S202).

The second base station 200 determines whether the amount of the allocated radio resources is greater than or equal to the radio resource amount threshold value (step S204).

When the amount of the allocated radio resources is greater than or equal to the radio resource amount threshold value (step S204: YES), the second base station 200 determines not to accept the call connection request from the user terminal 300 (step S206). For example, it is determined not to accept a call connection request from the unregistered user terminal.

When the amount of the allocated radio resources is less than the radio resource amount threshold value (step S204: NO), the second base station 200 determines to accept the call connection request from the user terminal 300, which is to be the target of performing the call connection (step S208).

By determining whether to accept the call connection request, based on the radio resource amount threshold value, it is possible to avoid congestion which is generated by accepting a large amount of calls. The congestion may be congestion within an apparatus.

<Call Acceptance Determination Method (Version 2)>

The second base station 200 has two threshold values of the radio resources (hereinafter, which are referred to as "the first radio resource amount threshold value," and "the second radio resource amount threshold value"). The first radio resource amount threshold value may be the amount of the radio resources for a case where the call connection request is determined not to be accepted, or the first radio resource amount threshold value may be the amount of the radio resources that is obtained by adding a predetermined margin to the amount of the radio resources or by subtracting a predetermined margin from the amount of the radio resources. Here, the target for performing the call connection may be a registered user terminal.

The second radio resource amount threshold value is an amount of radio resources for determining not to accept a call connection request from an unregistered user terminal. Here, even if the amount of the allocated radio resources exceeds the second radio resource amount threshold value, a call connection request from a registered user terminal is accepted. The second radio resource amount threshold value is preferably an amount of radio resources which is less than the first radio resource amount threshold value.

Figure 3:
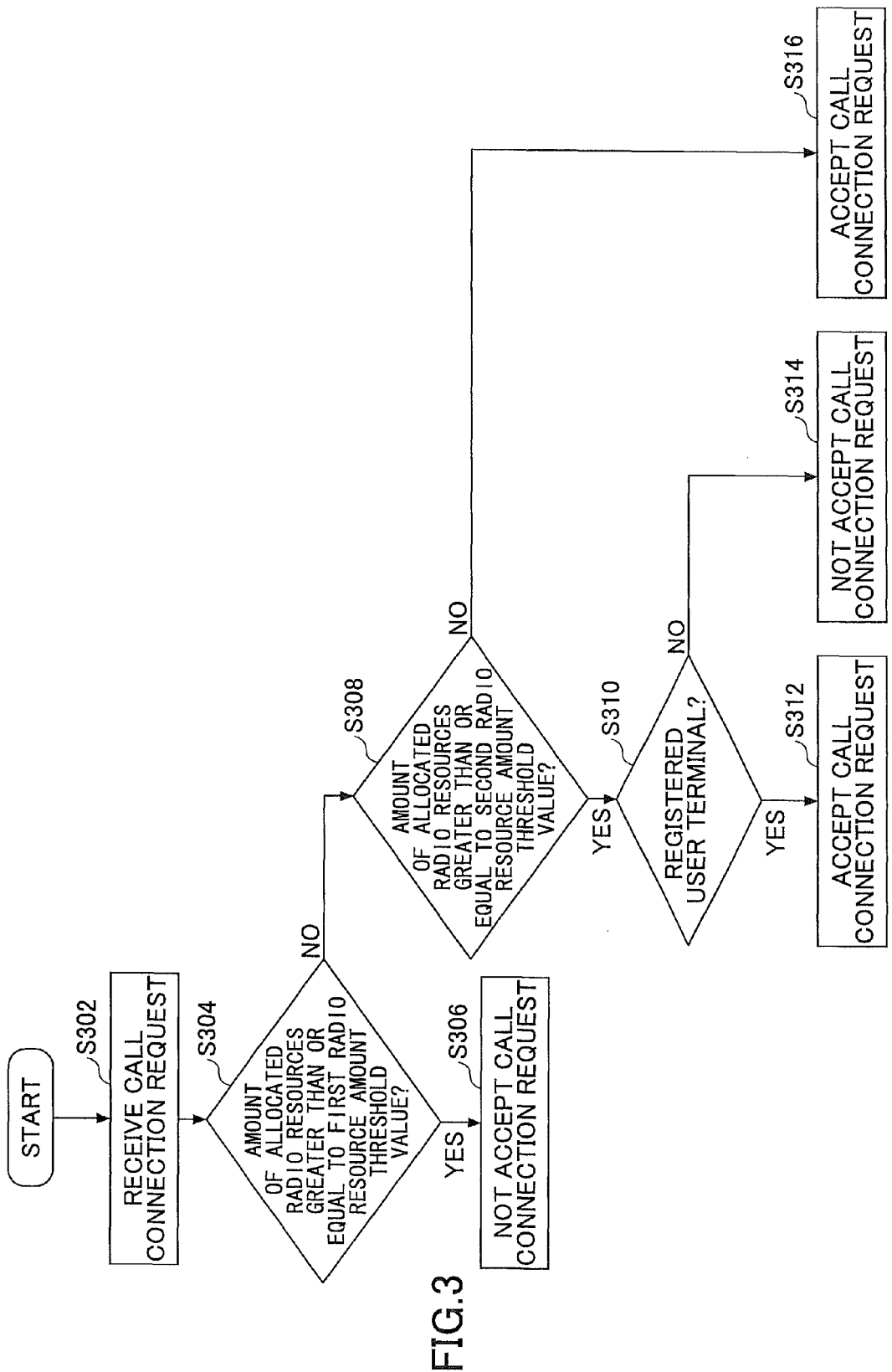
FIG. 3 is a flowchart showing a call acceptance determination method (version 2) according to the embodiment.

FIG. 3 is a flowchart showing the call acceptance determination method (version 2).

The second base station 200 receives the call connection request from the user terminal 300 (step S302). The second base station 200 determines whether the amount of the allocated radio resources is greater than or equal to the first radio resource amount threshold value (step S304).

When the amount of the allocated radio resources is greater than or equal to the first radio resource amount threshold value (step S304: YES), the second base station 200 determines not to accept the call connection request from the user terminal, regardless of whether the user terminal 300 is a registered user terminal (step S306).

When the amount of the allocated radio resources is less than the first radio resource amount threshold value (step S304: NO), the second base station 200 determines whether the amount of the allocated radio resources is greater than or equal to the second radio resource threshold value (step S308).

When the amount of the allocated radio resources is greater than or equal to the second radio resource amount threshold value (step S308: YES), in other words, when the amount of the allocated radio resources is less than the first radio resource amount threshold value and the amount of the allocated radio resources is greater than or equal to the second radio resource amount threshold value, the second base station 200 determines whether the user terminal 300 is a registered user terminal (step S310).

When the user terminal 300 is determined to be the registered user terminal (step S310: YES), the second base station 200 determines to accept the call connection request (step S312).

When the user terminal 300 is determined not to be the registered user terminal (step S310: NO), the second base station 200 determines not to accept the call connection request (step S314).

When the amount of the allocated radio resources is determined to be less than the second radio resource amount threshold value (step S308: NO), the second base station determines to accept the call connection request from the user terminal, regardless of whether the user terminal 300 is a registered user terminal (step S316).

By determining whether the call connection request is to be accepted based on the first radio resource amount threshold value and the second radio resource amount threshold value, it is possible to avoid congestion generated by receiving a large amount of calls. Further, by accepting only the call from the registered user terminal when the amount of the allocated radio resource is less than the first radio resource amount threshold value and the amount of the allocated radio resource is greater than or equal to the second radio resource amount threshold value, the call connection from the unregistered user terminal can be restricted, thereby ensuring radio resources for the registered user terminal.

<Call Acceptance Determination Method (Version 3)>

The second base station 200 manages the radio resources to be ensured for the registered user terminals and the radio resources to be ensured for the unregistered user terminals, while separating the radio resources to be ensured for the registered user terminals from the radio resources to be ensured for the unregistered user terminals. The second base station 200 has a threshold value of the radio resources to be ensured for the registered user terminals (hereinafter, which is referred to "the registered user radio resource amount threshold value"). The second base station 200 has a threshold value of the radio resources to be ensured for unregistered users (hereinafter, which is referred to "the unregistered user radio resource amount threshold value").

The registered user radio resource amount threshold value may be an amount of radio resources for a case where a call connection request is determined not to be accepted for a registered user terminal, or the registered user radio resource amount threshold value may be an amount of radio resources obtained by adding a predetermined margin to the amount of the radio resources or by subtracting a predetermined margin from the amount of the radio resources.

The unregistered user radio resource amount threshold value may be an amount of radio resources for a case where a call connection request is determined not to be accepted for an unregistered user terminal, or the unregistered user radio resource amount threshold value may be an amount of radio resources obtained by adding a predetermined margin to the amount of the radio resources or by subtracting a predetermined margin from the amount of the radio resources. The unregistered user radio resource amount threshold value is preferably an amount which is less than the registered user radio resource amount threshold value.

Figure 4:
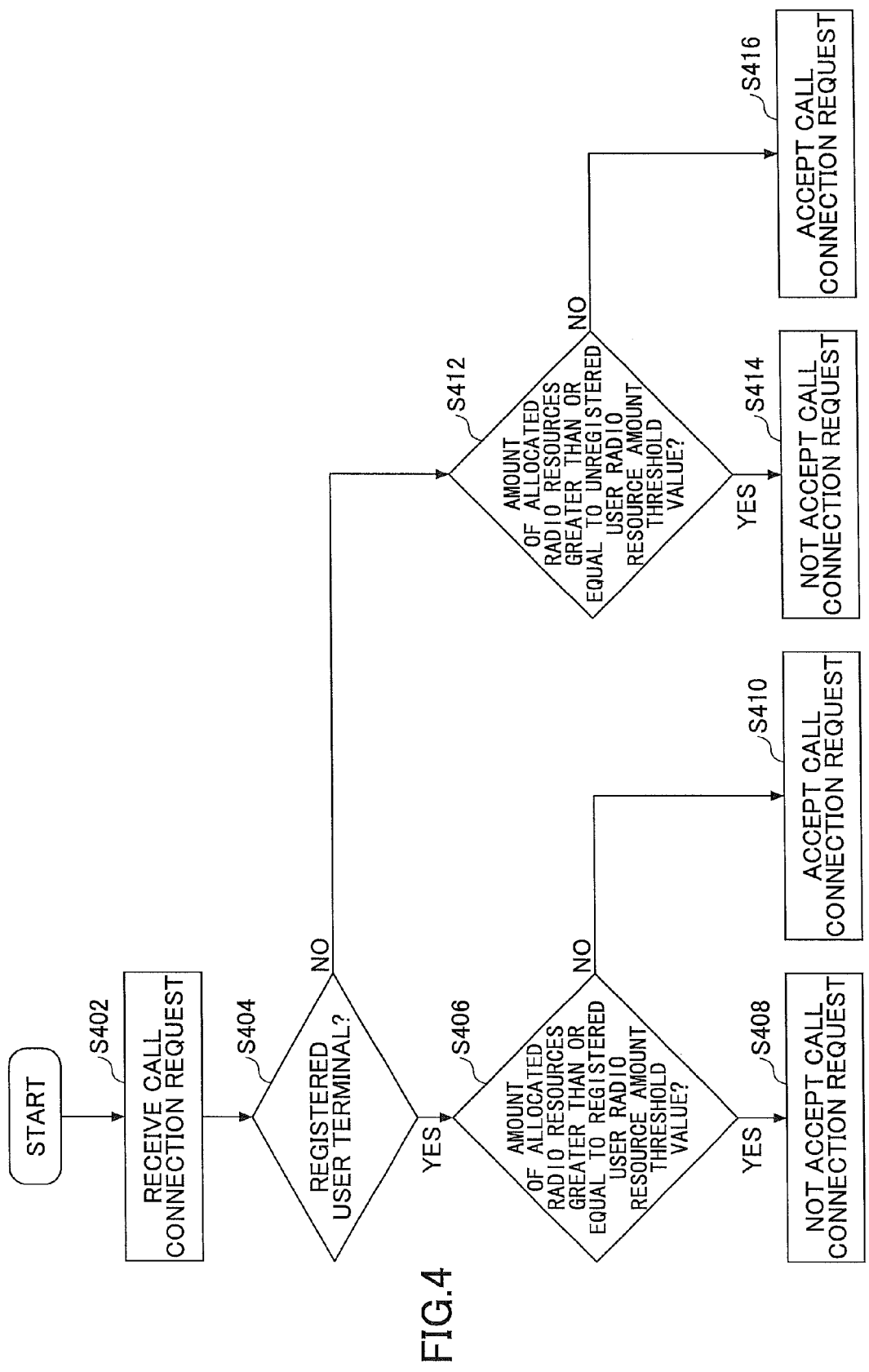
FIG. 4 is a flowchart showing a call acceptance determination method (version 3) according to the embodiment.

FIG. 4 is a flowchart showing the call acceptance determination method (version 3).

The second base station 200 receives the call connection request from the user terminal 300 (step S402).

The second base station 200 determines whether the user terminal 300 is a registered user terminal (step S404).

When the user terminal 300 is determined to be the registered user terminal (step S404: YES), the second base station 200 determines whether the amount of the allocated radio resources is greater than or equal to the registered user radio resource amount threshold value (step S406).

When the amount of the allocated radio resources is determined to be greater than or equal to the registered user radio resource amount threshold value (step S406: YES), the second base station 200 determines not to accept the call connection request from the user terminal 300 (step S408).

When the amount of the allocated radio resources is determined to be less than the registered user radio resource amount threshold value (step S406: NO), the second base station 200 determines to accept the call connection request from the user terminal 300 (step S410).

When the user terminal 300 is determined to be the unregistered user terminal (step S404: NO), the second base station 200 determines whether the amount of the allocated radio resources is greater than or equal to the unregistered user radio resource amount threshold value (step S412).

When the amount of the allocated radio resources is determined to be greater than or equal to the unregistered user radio resource amount threshold value (step S412: YES), the second base station 200 determines not to accept the call connection request from the user terminal 300 (step S414).

When the amount of the allocated radio resources is determined to be less than the unregistered user radio resource amount threshold value (step S412: NO), the second base station 200 determines to accept the call connection request from the user terminal 300 (step S416).

The second base station 200 prompts the user terminal of which the call connection request is determined not to be accepted to connect to a different base station. Prompting the user terminal to connect to the different base station may be referred to as the "redirection." The different base station is preferably the first base station 100 that covers a macro cell, which covers the cell covered by the second base station 200. This is because the likelihood of establishing a connection is increased. The different base station may be a different second base station that covers an area in the vicinity of the second base station 200. For example, it may be a femto base station or a pico base station.

<Details of the Second Base Station>

Figure 5:
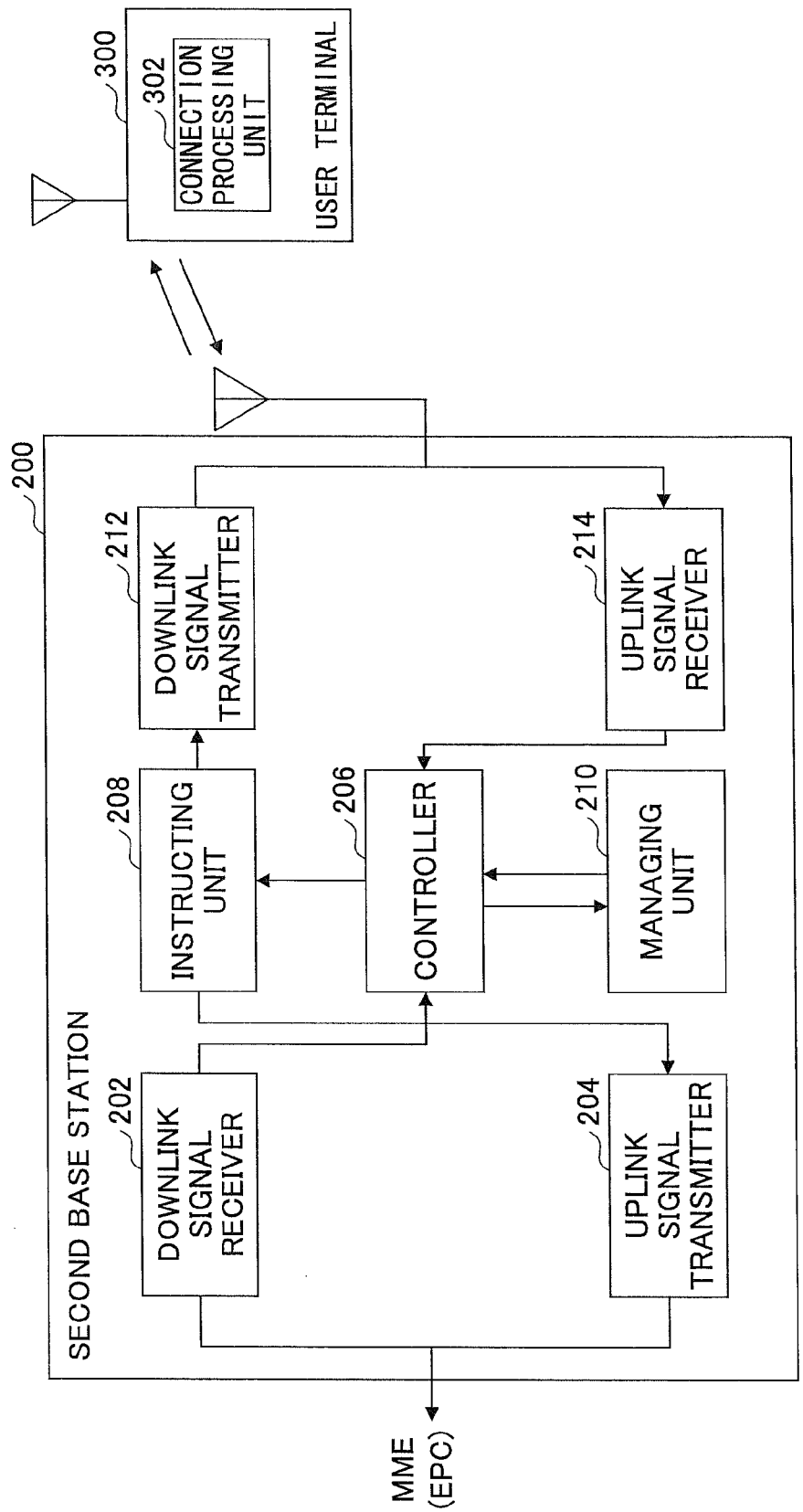
FIG. 5 is a functional block diagram showing an example of a base station according to the embodiment.

FIG. 5 shows the second base station 200 according to the embodiment.

The second base station 200 includes a downlink signal receiver 202. The downlink signal receiver 202 receives a downlink signal from a higher level apparatus, such as an MME. The downlink signals include an Initial Context Setup Request (a line setting command signal) and a UE Context Release Command (a line opening command signal). The downlink signal receiver 202 inputs the received downlink signal to a controller 206.

The second base station 200 includes an uplink signal receiver 214. The uplink signal receiver 214 receives the radio signals transmitted from the user terminal 300. The radio signals include "an initial connecting request signal" transmitted by the user terminal 300. The "initial connection request signal" is also referred to as the "random access channel (RACH) preamble." The uplink signal receiver 214 inputs the received uplink signal to the controller 206.

The second base station 200 includes a managing unit 210. The managing unit 210 is connected to the controller 206. The managing unit 210 manages setting information for accepting a call connection request from the user terminal 300. When the call acceptance determination method (version 1) is adopted, the setting information includes the radio resource amount threshold value. When the call acceptance determination method (version 2) is adopted, the setting information includes the first radio resource amount threshold value and the second radio resource amount threshold value. When the call acceptance determination method (version 3) is adopted, the setting information includes the registered user radio resource amount threshold value and the unregistered user radio resource amount threshold value.

The second base station 200 includes the controller 206. The controller 206 is connected to the downlink signal receiver 202, the uplink signal receiver 214, and the managing unit 210.

Figure 6:
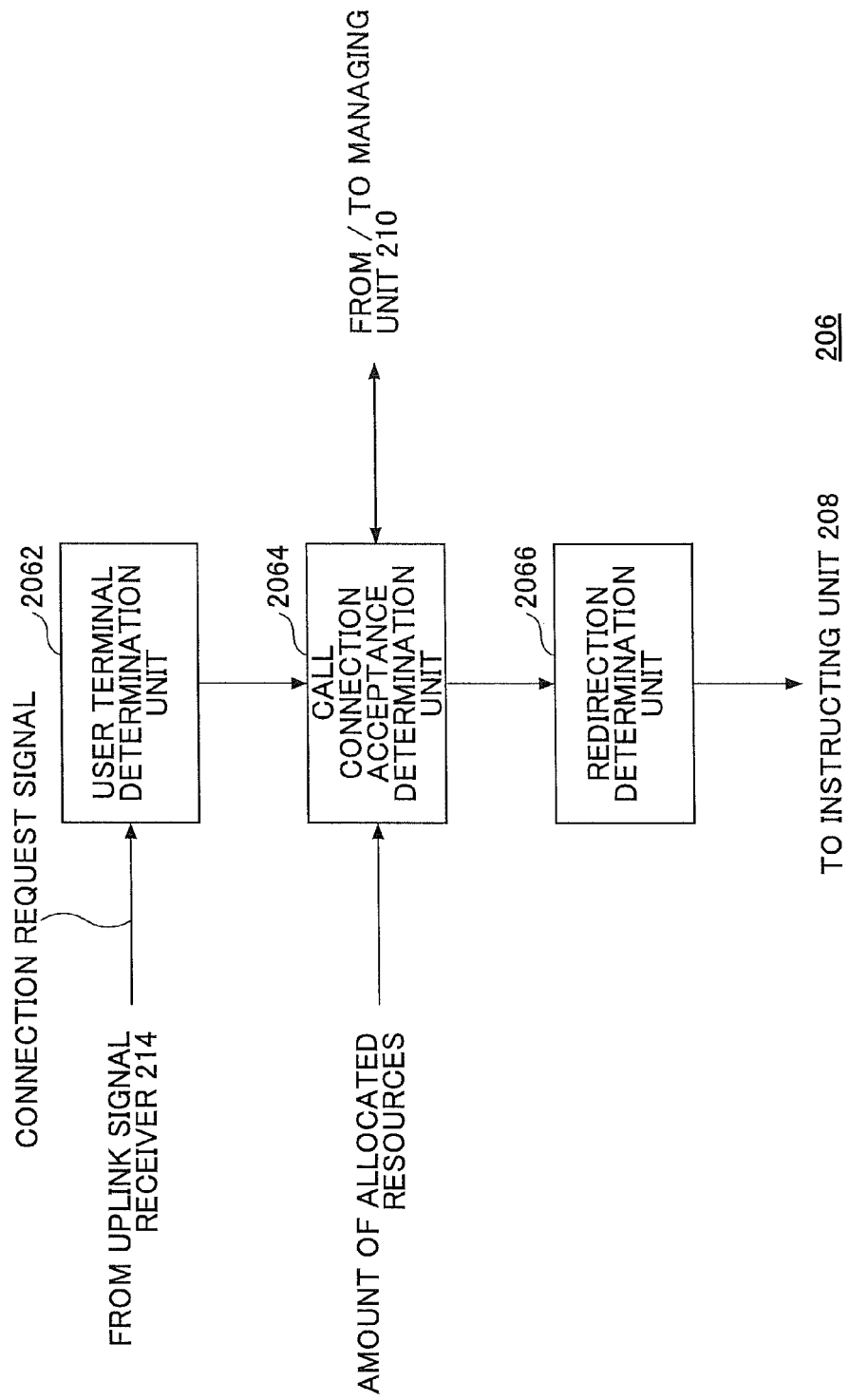
FIG. 6 is a functional block diagram showing an example of the base station according to the embodiment.

FIG. 6 shows functions of the controller 206.

The controller 206 includes a user terminal determination unit 2062. A connection request signal transmitted by the user terminal 300 is input from the uplink signal receiver 214 into the user terminal determination unit 2062. The user terminal determination unit 2062 determines whether the user terminal 300 is the registered user terminal, based on the connection request signal. The user terminal determination unit 2062 may store identifiers of the corresponding registered user terminals. The user terminal determination unit 2062 determines whether the identifier of the user terminal 300 which has transmitted the connection request signal is included in the identifiers of the registered user terminals stored in the user terminal determination unit 2062. The user terminal determination unit 2062 determines that the user terminal 300 is the registered user terminal when it is included in the identifiers of the registered user terminals, and the user terminal determination unit 2062 determines that the user terminal 300 is the unregistered user terminal when it is not included. The user terminal determination unit 2062 inputs information indicating whether the user terminal 300 that transmits the connection requesting signal is the registered user terminal to a call connection acceptance determination unit 2064.

The controller 206 includes the call connection acceptance determination unit 2064. The call connection acceptance determination unit 2064 is connected to the user terminal determination unit 2062. Information indicating the amount of the allocated radio resources is input to the call connection acceptance determination unit 2064.

The call connection acceptance determination unit 2064 determines, in accordance with the above described call acceptance determination method (version 1), whether the call connection request from the user terminal 300 is to be accepted based on the radio resource amount threshold value to be stored in the managing unit 210 and the amount of the allocated radio resources.

The call connection acceptance determination unit 2064 may determine, in accordance with the above described call acceptance determination method (version 2), whether the call connection request from the user terminal 300 is to be accepted, based on information indicating whether the user terminal that transmits the connection request signal is a registered user terminal (the information which is to be input by the user terminal determination unit 2062); the first radio resource amount threshold value to be stored in the managing unit 210; the second radio resource amount threshold value; and the amount of the allocated radio resources.

The call connection acceptance determination unit 2064 may determine, in accordance with the above described call acceptance determination method (version 3), whether the call connection request from the user terminal 300 is to be accepted, based on information indicating whether the user terminal that transmits the connection request signal is a registered user terminal (the information which is to be input by the user terminal determination unit 2062); the registered user radio resource amount threshold value to be stored in the managing unit 210; the unregistered user radio resource amount threshold value; and the amount of the allocated radio resources. The call connection acceptance determination unit 2064 inputs information indicating whether the call connection request from the user terminal 300 is to be accepted into a redirection determination unit 2066.

The controller 206 includes the redirection determination unit 2066. The redirection determination unit 2066 is connected to the call connection acceptance determination unit 2064. The information indicating whether the call connection request from the user terminal 300 is to be accepted is input from the call connection acceptance determination unit 2064 to the redirection determination unit 2066. When the information input from the call connection acceptance determination unit 2064 is information indicating that the call connection request from the user terminal 300 is to be accepted, the redirection determination unit 2066 determines not to perform redirection for the user terminal 300. In this case, the second base station 200 continues the connection process with the user terminal 300. For example, the second base station 200 may transmit a Security Mode Command (a confidential authentication command signal) and an RRC Connection Reconfiguration (a line setting/measurement command signal) to the user terminal 300. Additionally, the second base station 200 may receive a Security Mode Complete (a confidential authentication command acknowledgement signal) and an RRC Connection Reconfiguration Complete (a line setting/measurement command acknowledgement signal) from the user terminal 300. Further, the second base station 200 may transmit an Initial Context Setup Response (a line setting acknowledgement signal).

When the information input from the call connection acceptance determination unit 2064 is information indicating that the call connection request from the user terminal 300 is not to be accepted, the redirection determination unit 2066 determines to perform the redirection for the user terminal 300. The redirection determination unit 2066 selects a different base station to which the user terminal 300 is to be redirected. The different base station is preferably a macro base station that covers a cell, which is covered by the second base station 200. By redirecting the user terminal 300 to the macro base station that covers the cell, which is covered by the second base station 200, the probability that the user terminal is connected can be increased. The redirection determination unit 2066 inputs information indicating a base station to which the user terminal is to be redirected into an instructing unit 208. Further, the different base station may be a macro base station that covers at least a portion of the cell, which is covered by the second base station 200. Further, the different base station may be a different second base station that covers an area in the vicinity of the second base station 200. For example, it may be a femto base station, or a pico base station.

The second base station 200 includes the instructing unit 208. The instructing unit 208 is connected to the controller 206. The instructing unit 208 instructs to transmit a predetermined signal when the controller 206 determines that the connection process is continued. In accordance with the information, which is to be input from the controller 206 and which indicates the base station to which the user terminal 300 is to be redirected, the instructing unit 208 performs instructions for reporting information, which indicates the base station to which the user terminal 300 is to be redirected, to the user terminal 300 which made the request for the connection. For example, the information representing the base station may be included in the RRC Connection Release (the line opening command signal). Specifically, information indicating frequency bands supported by the base station to which the user terminal is to be redirected may be included in the RRC Connection Release. For example, it may be included in "cause." The instructing unit 208 inputs the RRC Connection Release to a downlink signal transmitter 212.

The second base station 200 includes the downlink signal transmitter 212. The downlink signal transmitter 212 is connected to the instructing unit 208. The downlink signal transmitter 212 wirelessly transmits the RRC Connection Release, which is to be input from the instructing unit 208, from the antenna.

The second base station 200 includes an uplink signal transmitter 204. The uplink signal transmitter 204 is connected to the instructing unit 208. The uplink signal transmitter 204 transmits an uplink signal, which is to be input by the instructing unit 208, to the MME. The uplink signal includes an Initial UE Message (a line setting request signal) and a UE Context Release Request (a line opening request signal).

<User Terminal>

The user terminal 300 includes a connection processing unit 302. The connection processing unit 302 performs a connection process with the second base station 200. The connection processing unit 302 performs redirection to a different base station that is designated by the second base station 200.

<Operations of the System>

Figure 7:
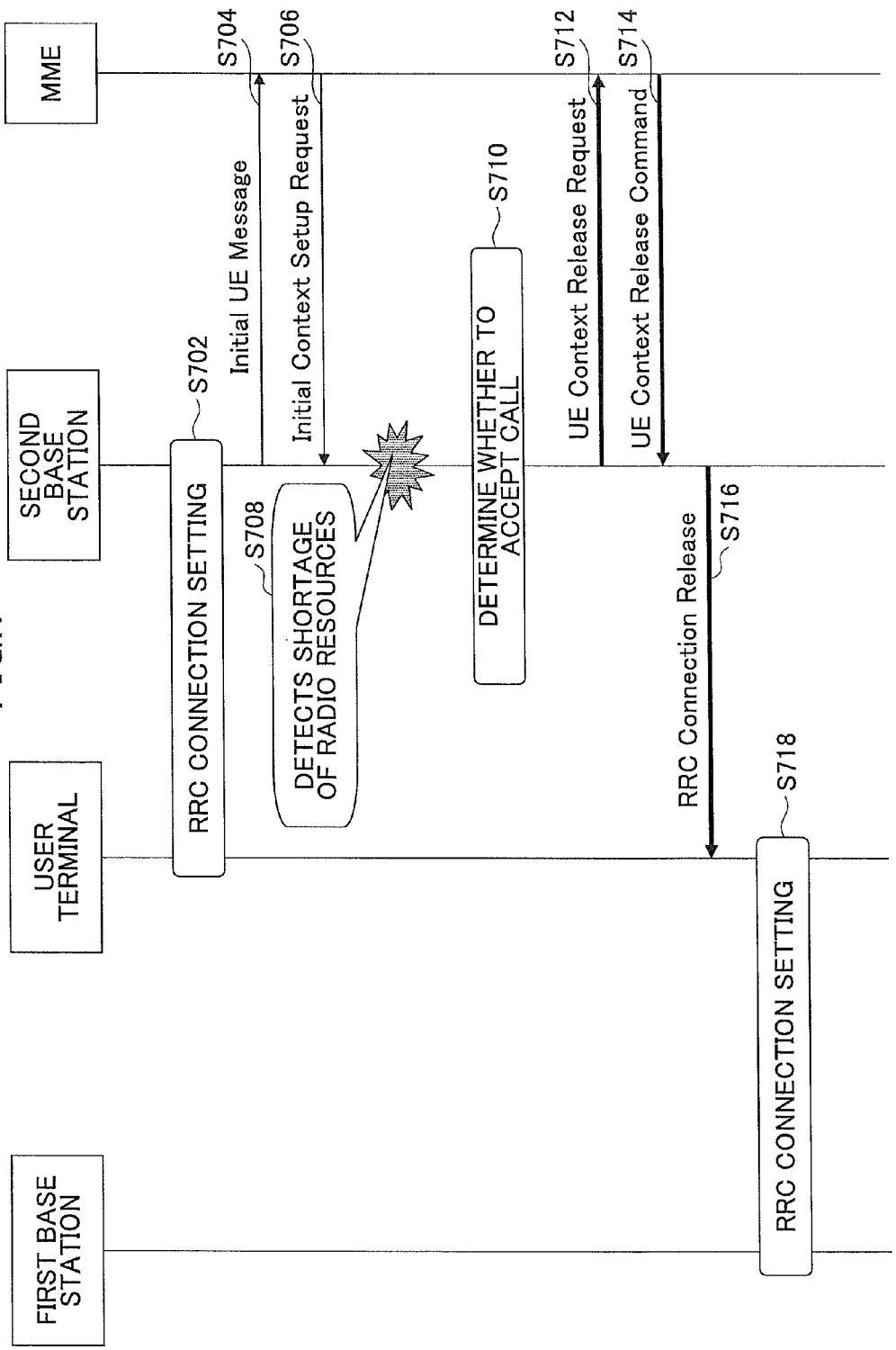
FIG. 7 is a sequence chart showing an example of operations of a system according to the embodiment.

FIG. 7 is a sequence chart showing operations of the system.

The RRC Connection setting is performed between the user terminal 300 and the second base station 200 (step S702).

The second base station 200 transmits the Initial UE Message (the line setting request signal) to the MME, so as to request setting of a line with the user terminal 300 (step S704). For example, the instructing unit 208 generates the Initial UE Message in accordance with a command from the controller 206. The instructing unit 208 instructs the uplink signal transmitter 204 to transmit the Initial UE Message to the MME. The uplink signal transmitter 204 transmits the Initial UE Message, which is input by the instructing unit 208, to the MME, in accordance with the instruction by the instructing unit 208.

The MME transmits the Initial Context Setup Request (the line setting command signal) to the second base station 200 (step S706). The Initial Context Setup Request is for establishing the line between the second base station 200 and the user terminal 300 and for instructing the second base station 200 to establish the line.

The second base station 200 detects that an amount of the radio resources is insufficient (step S708).

For example, when the amount of the allocated radio resources is greater than or equal to the radio resource amount threshold value, in accordance with the call acceptance determination method (version 1), the call connection acceptance determination unit 2064 determines that the amount of the radio resources is insufficient.

Further, for example, when the user terminal that transmits the connection request signal is a registered user terminal and the amount of the allocated radio resources is greater than or equal to the first radio resource amount threshold value, the call connection acceptance determination unit 2064 determines that the amount of the radio resources is insufficient, in accordance with the above-described call acceptance determination method (version 2). When the user terminal that transmits the connection request signal is not a registered user terminal and the amount of the allocated radio resources is greater than or equal to the second radio resource amount threshold value, the call connection acceptance determination unit 2064 determines that that the amount of the radio resources is insufficient.

Further, for example, when the user terminal that transmits the connection request signal is a registered user terminal and the amount of the allocated radio resources is greater than or equal to the registered user radio resource amount threshold value, the call connection acceptance determination unit 2064 determines that the amount of the radio resources is insufficient, in accordance with the above-described call acceptance determination method (version 3). When the user terminal that transmits the connection request signal is not a registered user terminal and the amount of the allocated radio resources is greater than or equal to the unregistered user radio resource amount threshold value, the call connection acceptance determination unit 2064 determines that the amount of the radio resources is insufficient.

The second base station 200 determines whether to accept the call connection (step S718). For example, the call connection acceptance determination unit 2064 determines whether to accept the call connection. When the call connection is determined to be accepted, the connection process is continued.

When the call connection is determined not to be accepted, in order to request opening of the line between the second base station 200 and the user terminal 300, the second base station 200 transmits the UE Context Release Request (the line opening request signal) to the MME (step S712).

The MME transmits the UE Context Release Command (the line opening command signal) (step S714). The UE Context Release Command is for opening the line between the second base station 200 and the user terminal 300 and for instructing the second base station 200 to release the line.

The second base station 200 wirelessly transmits the RRC Connection Release (the line opening command signal) to the user terminal 300 (step S716). The RRC Connection Release is for opening the line. For example, the redirection determination unit 2066 inputs information indicating a base station, to which the user terminal 300 is to be redirected, into the instructing unit 208. During generation of the RRC Connection Release, the instructing unit 208 includes the information indicating the base station, to which the user terminal 300 is to be redirected. The instructing unit 208 inputs the RRC Connection Release into the downlink signal transmitter 212. The downlink signal transmitter 212 wirelessly transmits the RRC Connection Release to the user terminal 300.

The user terminal 300 performs setting of the RRC Connection with the different base station (step S718), in accordance with the information included in the RRC Connection Release from the second base station 200 and indicating the different base station, to which the user terminal is to be redirected.

In the embodiment, a process similar to the above-described process may be performed when the first base station determines to cause the user terminal 300 to perform a handover to the second base station. For example, the second base station that receives an initial connection request from the user terminal 300 may determine whether to cause the user terminal 300 to perform a handover, based on the amount of the allocated radio resources of the second base station.

According to the embodiment, when the second base station is set to be accessible to registered user terminals and unregistered user terminals, the radio resources can be ensured for the registered user terminals. Since the radio resources are ensured, the throughputs of the registered user terminals can be increased. Further, the probability of successfully establishing a connection between the registered user terminal and the second base station can be increased. Further, the probability of successfully causing a registered user terminal to perform a handover can be increased.

According to the embodiment, it is expected that the throughput may be increased also for unregistered user terminals, provided that the radio resources are ensured. Further, when the radio resources are not ensured, a flexible control can be performed, such as causing the user terminal requesting the connection to perform redirection to the macro base station.

Modified Example

<System>

The environment to which the base station according to a modified example is applied is the same the environment that is explained by referring to FIG. 1.

<First Base Station>

The first base station 100 is the same as the first base station according to the above-described embodiment.

<Second Base Station>

The second base station 200 is different from the second base station according to the above-described embodiment in the determination method for determining whether to accept a call connection request from the user terminal 300.

The second base station 200 determines whether to accept a call connection request, depending on the number of user terminals that are in RRC Connected states with the second base station 200 (hereinafter, which is referred to as "the number of the connected user terminals"). In other words, the number of the connected user terminals is used as an index representing the amount of the allocated radio resources. Here, the user terminals, the number of the user terminals being included in the number of the connected user terminals, may be unregistered user terminals, or may be the unregistered user terminals and registered user terminals.

<Call Acceptance Determination Method (Version 4)>

The second base station 200 has two threshold values for the number of the connected user terminals (hereinafter, which are referred to as "the first connected user terminal number threshold value" and "the second connected user terminal number threshold value"). The first connected user terminal number threshold value may be the number of the connected user terminals for a case where the call connection request is determined not to be accepted, or the first connected user terminal number threshold value may be a value which is obtained by adding a predetermined margin to the number of the connected user terminals or by subtracting a predetermined margin from the number of the connected user terminals.

The second connected user terminal number threshold value is the number of the connected user terminals for determining not to accept the call connection request from an unregistered user terminal. The second connected user terminal number threshold value is preferably a value which is less than the first connected user terminal threshold value.

Figure 8:
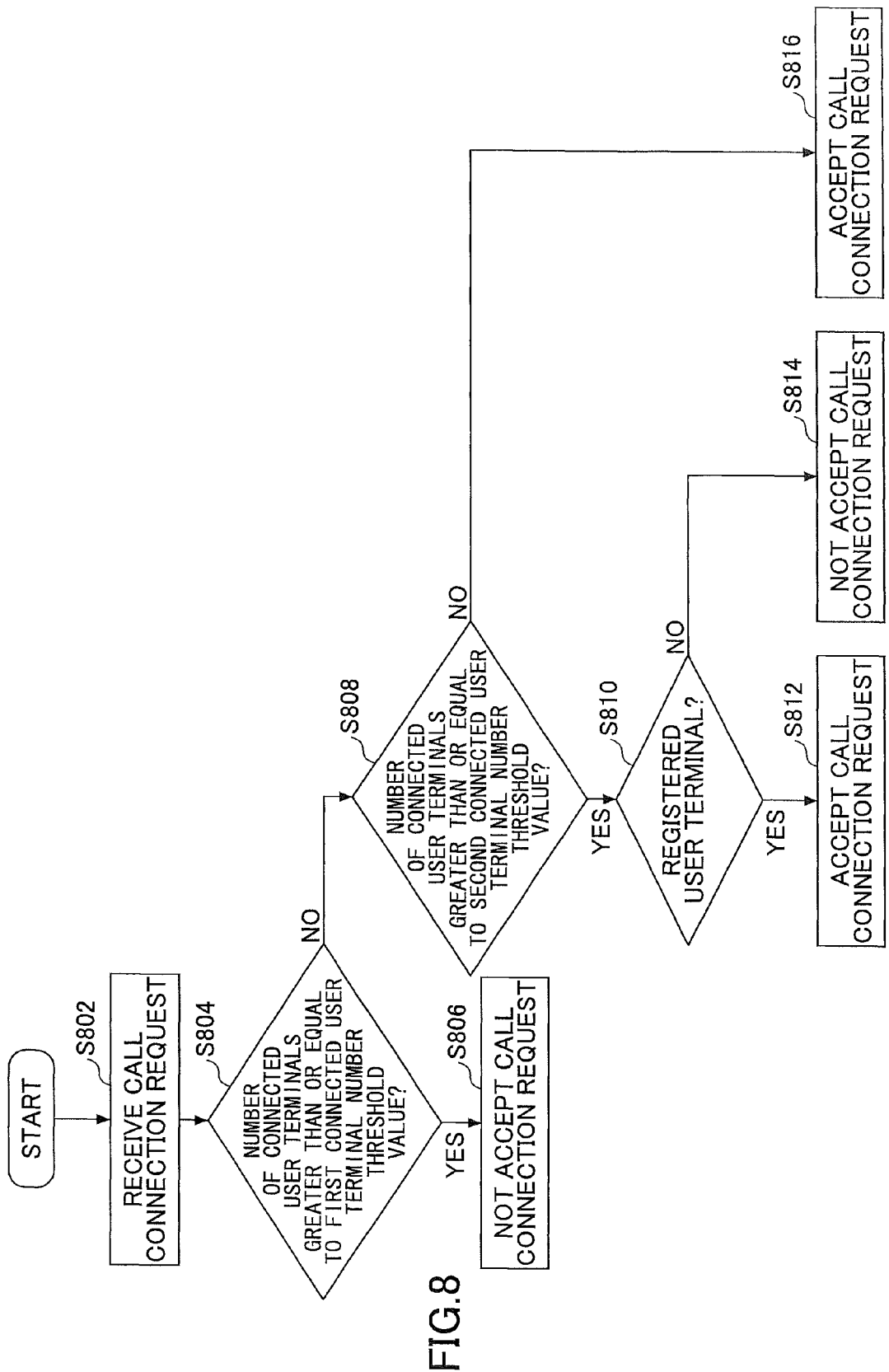
FIG. 8 is a flowchart showing a call acceptance determination method (version 4) according to an embodiment.

FIG. 8 is a flowchart showing a call acceptance determination method (version 4).

The second base station 200 receives the call connection request from the user terminal 300 (step S802).

The second base station 200 determines whether the number of the connected user terminals is greater than or equal to the first connected user terminal number threshold value (step S804).

When the number of the connected user terminals is greater than or equal to the first connected user terminal number threshold value (step S804: YES), the second base station 200 determines not to accept the call connection request from the user terminal 300, regardless of whether the user terminal 300 is a registered user terminal (step S806).

When the number of the connected user terminals is less than the first connected user terminal number threshold value (step S804: NO), the second base station 200 determines whether the number of the connected user terminals is greater than or equal to the second connected user terminal number threshold value (step S808).

When the number of the connected user terminals is greater than or equal to the second connected user terminal number threshold value (step S808: YES), in other words, when the number of the connected user terminals is less than the first connected user terminal number threshold value and the number of the connected user terminals is greater than or equal to the second connected user terminal number threshold value, the second base station 200 determines whether the user terminal 300 is a registered user terminal (step S810).

When the user terminal 300 is determined to be the registered user terminal (step S810: YES), the second base station 200 determines to accept the call connection request (step S812).

When the user terminal 300 is determined not to be the registered user terminal (step S810: NO), the second base station 200 determines not to accept the call connection request (step S814).

When the number of the connected user terminals is determined to be less than the second connected user terminal number threshold value (step S808: NO), the second base station 200 determines to accept the call connection request from the user terminal, regardless of whether the user terminal 300 is the registered user terminal (step S816).

By determining whether to accept the call connection request based on the first connected user terminal number threshold value and the second connected user terminal number threshold value, congestion caused by accepting a large number of calls can be avoided. Further, by accepting only a call from a registered user terminal when the number of the connected user terminals is less than the first connected user terminal number threshold value and the number of the connected user terminals is greater than or equal to the second connected user terminal number threshold value, a call connection for an unregistered user terminal can be regulated, thereby ensuring the radio resources for the registered user terminals.

<Call Acceptance Determination Method (Version 5)>

The second base station 200 manages the number of the connected user terminals to be ensured for registered user terminals and the number of the connected user terminals to be ensured for unregistered user terminals, while separating the number of the connected user terminals to be ensured for the registered user terminals from the number of the connected user terminals to be ensured for the unregistered user terminals. The second base station 200 has a threshold value for the number of the connected user terminals to be ensured for the registered user terminals (hereinafter, which is referred to as "the registered user terminal number threshold value"). The second base station 200 has a threshold value for the number of the connected user terminals to be ensured for the unregistered user terminals (hereinafter, which is referred to as "the unregistered user terminal number threshold value").

The registered user terminal number threshold value may be the number of the connected user terminals for determining not to accept a call connection request for a registered user terminal, or the registered user terminal number threshold value may be a value obtained by adding a predetermined margin to the number of the connected user terminals or by subtracting a predetermined margin from the number of the connected user terminals.

The unregistered user terminal number threshold value may be the number of the connected user terminals for a case where the call connection request is determined not to be accepted for an unregistered user terminal, or the unregistered user terminal number threshold value may be an amount that is obtained by adding a predetermined margin to the number of the connected user terminals or by subtracting a predetermined margin from the number of the connected user terminals. The unregistered user terminal number threshold value is preferably a value which is less than the registered user terminal number threshold value.

Figure 9:
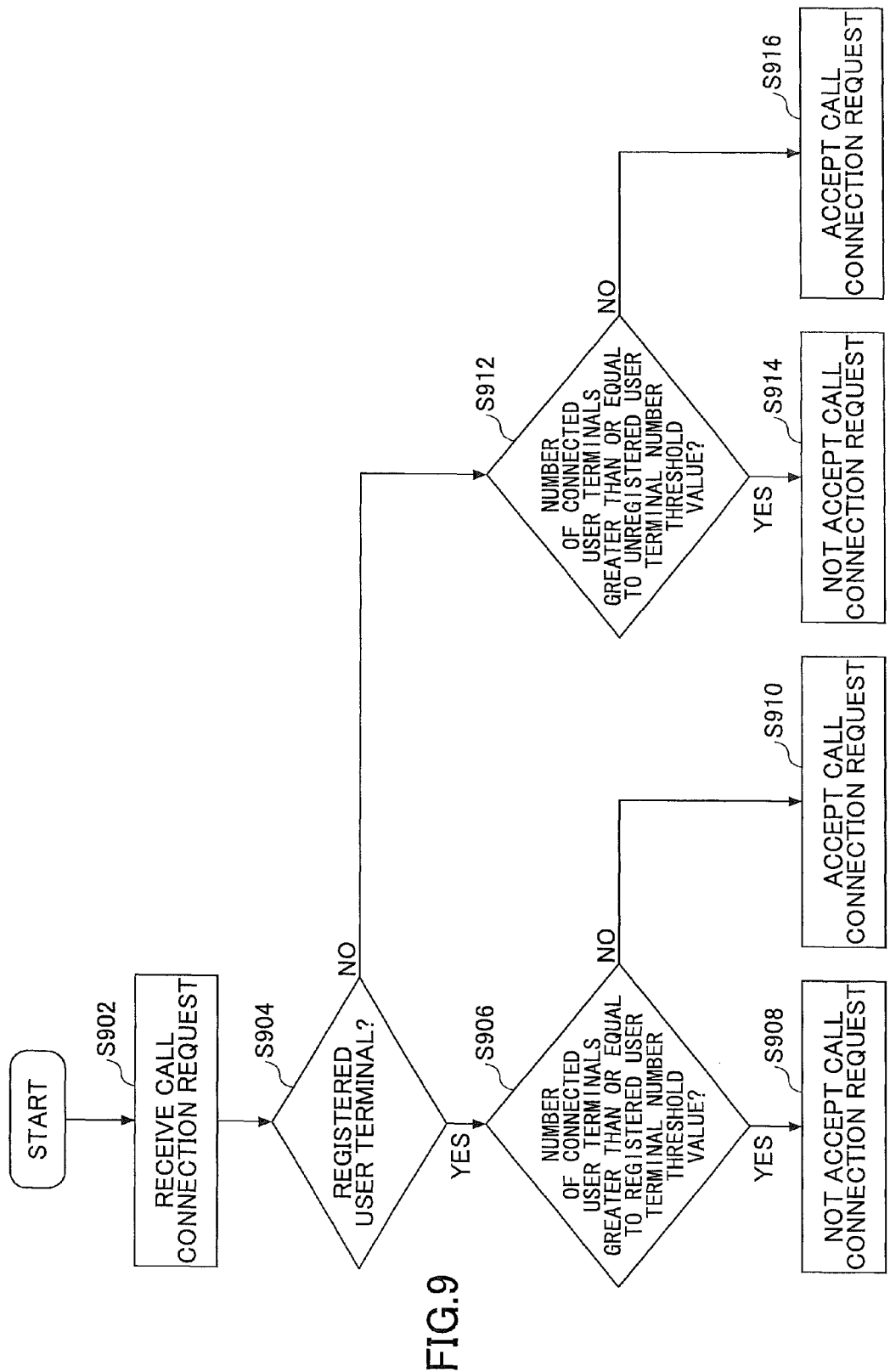
FIG. 9 is a flowchart showing a call acceptance determination method (version 5) according to an embodiment.

FIG. 9 is a flowchart showing a call acceptance determination method (version 5).

The second base station 200 receives a call connection request from the user terminal 300 (step S902).

The second base station 200 determines whether the user terminal 300 is a registered user terminal (step S904).

When the user terminal 300 is determined to be the registered user terminal (step S904: YES), the second base station 200 determines whether the number of the connected user terminals is greater than or equal to the registered user terminal number threshold value (step S906).

When the number of the connected user terminals is determined to be greater than or equal to the registered user terminal number threshold value (step S906: YES), the second base station 200 determines not to accept a call connection request from the user terminal 300 (step S908).

When the number of the connected user terminals is determined to be less than the registered user terminal number threshold value (step S906: NO), the second base station 200 determines to accept the call connection request from the user terminal 300 (step S910).

When the user terminal 300 is determined to be the unregistered user terminal (step S904: NO), the second base station 200 determines whether the number of the connected user terminals is greater than or equal to the registered user terminal number threshold value (step S912).

When the number of the connected user terminals is determined to be greater than or equal to the registered user terminal number threshold value (step S912: YES), the second base station 200 determines not to accept the call connection request from the user terminal 300 (step S914).

When the number of the connected user terminals is less than the registered user terminal number threshold value (step S912: NO), the second base station 200 determines to accept the call connection request from the user terminal 300 (step S916).

The second base station 200 redirects the user terminal, whose call connection request is determined not to be accepted, so that the user terminal is prompted to be connected to a different base station. The different base station is preferably the first base station 100 that covers a macro cell, which covers a cell covered by the second base station 200.

That is because the probability that the connection can be established is increased. The different base station may be another second base station that covers an area in the vicinity of the second base station 200. For example, the different base station may be a femto base station or a pico base station.

The second base station 200 is explained by functional blocks which are the same as those of the second base station that are explained by referring to FIG. 5. The second base station 200 is different from the second base station that is explained by referring to FIG. 5 in the information stored in the managing unit 210 and in the processing of the controller 206.

The managing unit 210 manages setting information for accepting a call connection request from the user terminal 300. When the call acceptance determination method (version 1) is applied, the setting information includes the first connected user terminal number threshold value and the second connected user terminal number threshold value. When the call acceptance determination method (version 2) is applied, the setting information includes the registered user terminal number threshold value and the unregistered user terminal number threshold value.

Figure 10:
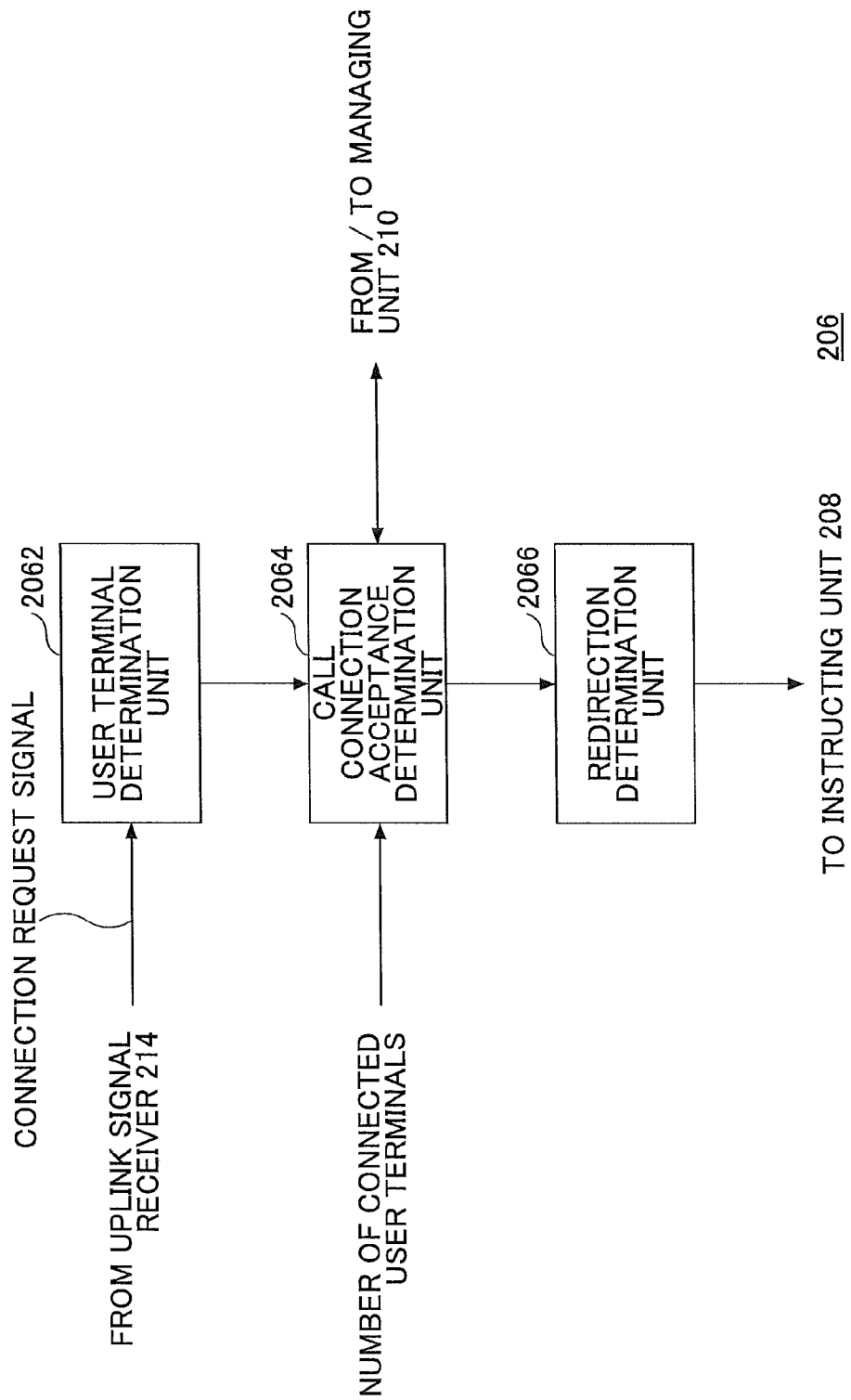
FIG. 10 is a functional block diagram showing an example of the base station according to the embodiment.

FIG. 10 shows functions of the controller 206.

The controller 206 includes the user terminal determination unit 2062. The connection request signal transmitted from the user terminal 300 is input from the uplink signal receiver 214 to the user terminal determination unit 2062. The user terminal determination unit 2062 determines whether the user terminal 300 is a registered user terminal based on the connection request signal. The user terminal determination unit 2062 may store identifiers of the registered user terminals. The user terminal determination unit 2062 determines whether the identifier of the user terminal 300 that transmits the connection request signal is included in the identifiers of the registered user terminals stored in the user terminal determination unit 2062. When the identifier is determined to be included in the identifiers of the registered user terminals, the user terminal determination unit 2062 determines that the user terminal 300 is the registered user terminal. When the identifier is determined not to be included in the identifiers of the registered user terminals, the user terminal determination unit 2062 determines that the user terminal 300 is the unregistered user terminal. The user terminal determination unit 2062 inputs information indicating whether the user terminal that transmits the connection request signal is the registered user terminal to the call connection acceptance determination unit 2064.

The controller 206 includes the call connection acceptance determination unit 2064. The call connection acceptance determination unit 2064 is connected to the user terminal determination unit 2062. Information indicating the number of the connected user terminals is input to the call connection acceptance determination unit 2064.

The call connection acceptance determination unit 2064 determines whether the call connection request from the user terminal 300 is to be accepted, based on the first connected user terminal number threshold value and the second connected user terminal number threshold value to be stored in the managing unit 210, and the number of the connected user terminals, in accordance with the above-described call acceptance determination method (version 4).

The call connection acceptance determination unit 2064 may determine whether the call connection request from the user terminal 300 is to be accepted, based on the information indicating whether the user terminal that transmits the connection request signal is a registered user terminal (the information which is to be input by the user terminal determination unit 2062); the registered user terminal number threshold value and the unregistered user terminal number threshold value to be stored in the managing unit 210; and the number of the connected user terminals, in accordance with the call acceptance determination method (version 5).

The call connection acceptance determination unit 2064 inputs the information indicating whether the call connection request from the user terminal 300 is to be accepted to the redirection determination unit 2066.

The controller 206 includes the redirection determination unit 2066. The redirection determination unit 2066 is connected to the call connection acceptance determination unit 2064. The information indicating whether the call connection request from the user terminal 300 is to be accepted is input from the call connection acceptance determination unit 2064 to the redirection determination unit 2066. When the information input from the call connection acceptance determination unit 2064 is the information indicating that the call connection request from the user terminal 300 is to be accepted, the redirection determination unit 2066 determines not to perform redirection for the user terminal 300. In this case, the second base station 200 continues the connection process with the user terminal 300.

When the information input from the call connection acceptance determination unit 2064 is the information indicating that the call connection request from the user terminal 300 is not to be accepted, the redirection determination unit 2066 determines to perform the redirection for the user terminal 300. The redirection determination unit 2066 selects a different base station to which the user terminal 300 is to be redirected. The different base station is preferably a macro base station that covers a cell, which is covered by the second base station 200. By redirecting the user terminal 300 to the macro base station that covers the cell, which is covered by the second base station 200, the probability that the user terminal 300 becomes connected can be increased. The redirection determination unit 2066 inputs the information indicating the base station to which the user terminal 300 is to be redirected into the instructing unit 208. The different base station may be a macro base station that covers at least the cell, which is covered by the second base station 200. Alternatively, the different base station may be another second base station that covers an area in the vicinity of the second base station 200. For example, the different base station may be a femto base station, or a pico base station.

<User Terminal (User Equipment)>

The user terminal 300 is the same as that of the above-described embodiment.

<Operations of the System>

Operations of the system are different from the sequence chart that is explained by referring to FIG. 7 in the process of step S708 and in step S710.

<Case where the Call Acceptance Determination Method (Version 4) is Applied>

At step S708, the second base station 200 determines whether the number of the connected user terminals is greater than or equal to the first connected user terminal number threshold value. When the number of the connected user terminals is greater than or equal to the first connected user terminal number threshold value, the second base station 200 determines that the amount of the radio resources is insufficient.

When the number of the connected user terminals is less than the first connected user terminal number threshold value, the second base station 200 determines whether the number of the connected user terminals is greater than or equal to the second connected user terminal number threshold value.

When the number of the connected user terminals is less than the first connected user terminal number threshold value and the number of the connected user terminals is greater than or equal to the second connected user terminal number threshold value, the second base station 200 determines that the amount of the radio resources is slightly insufficient.

When the number of the connected user terminals is less than the second connected user terminal number threshold value, the second base station 200 determines that the amount of the radio resources is sufficient.

At step S710, for a case where the amount of the radio resources is determined to be insufficient at step S708, the second base station 200 determines not to accept the call connection request from the user terminal 300.

For a case where the amount of the radio resources is determined to be slightly insufficient, the second base station 200 determines to accept the call connection request when the user terminal 300 is a registered user terminal. The second base station 200 determines not to accept the call connection request when the user terminal 300 is an unregistered user terminal.

For a case where the amount of the radio resources is determined to be sufficient, the second base station 200 determines to accept the call connection request from the user terminal, regardless of whether the user terminal 300 is a registered user terminal.

<Case where the Call Acceptance Determination Method (Version 5) is Applied>

At step S708, for a case where the user terminal 300 that requests the call connection is a registered user terminal, the second base station 200 determines whether the number of the connected user terminals is greater than or equal to the registered user terminal number threshold value. When the number of the connected user terminals is greater than or equal to the registered user terminal number threshold value, the second base station 200 determines that the amount of the radio resources is insufficient. When the number of the connected user terminals is less than the connected user terminal number threshold value, the second base station 200 determines that the amount of the radio resources is sufficient.

When the user terminal 300 that requests the call connection is an unregistered user terminal, the second base station 200 determines whether the number of the connected user terminals is greater than or equal to the unregistered user terminal number threshold value.

When the number of the connected user terminals is greater than or equal to the unregistered user terminal number threshold value, the second base station 200 determines that the amount of the radio resources is insufficient.

When the number of the connected user terminals is less than the unregistered user terminal number threshold value, the second base station 200 determines that the amount of the radio resources is sufficient.

At step S710, for a case where the amount of the radio resources is determined to be insufficient at step S708, the second base station 200 determines not to accept the call connection request from the user terminal 300.

For a case where the amount of the radio resources is determined to be sufficient at step S708, the second base station 200 determines to accept the call connection request from the user terminal 300.

In the modified example, when the user terminal is caused to perform a handover from the first base station to the second base station, the determination as to whether to cause the user terminal to perform the handover may be made based on the number of the user terminals connected to the second base station. For example, when an initial connection request signal from the user terminal 300 is received, determination as to whether to cause the user terminal 300 to perform a handover is made based on the number of the user terminals connected to the second base station.

According to the modified example, for a case where the second base station is set to be accessible to registered user terminals and unregistered user terminals, the radio resources can be ensured for the registered user terminals. As an index for determining as to whether the radio resources can be ensured, the number of the connected user terminals is utilized. Since the radio resources are ensured, throughputs for the registered user terminals can be increased. In addition, the probability of successfully establishing a connection with a registered user terminal can be increased. Further, the probability of successfully performing a handover for a registered user terminal can be increased.

According to the modified example, even for unregistered user terminals, it is expected that throughputs are increased, provided that the radio resources are ensured. Further, for a case where the radio resources are not ensured, a flexible control may be performed such as redirecting a newly connecting user terminal to a macro base station.

Second Embodiment

<System>

The environment to which base stations according to this embodiment are applied is the same as the environment that is explained by referring to FIG. 1.

<First Base Station>

The first base station 100 is the same as the first base station according to the above-described embodiment.

<Second Base Station>

The second base station 200 forms a hybrid cell. In the hybrid cell, in addition to a user group having rights to access the hybrid cell, access rights are granted to a user group not having rights to access the hybrid cell. Namely, in the hybrid cell, registered user terminals and unregistered user terminals co-exist.

The second base station 200 determines as to whether to perform call disconnection for the user terminal 300 currently connected, depending on the amount of the allocated resources of the second base station 200. Here, the amount of the allocated resources includes radio resources and resources such as parameters that are required for connection control. Another element may be included. In the embodiment, a case is mainly explained where the amount of the allocated radio resources is utilized as an example of the amount of the allocated resources. A case where resources other than the amount of the allocated resources are utilized is the same.

The second base station 200 determines as to whether to perform the call disconnection for the user terminal 300 currently connected, depending on the amount of the allocated radio resources. Here, the amount of the allocated radio resources may be a total of the amounts of the radio resources that are allocated to user terminals currently connected. Alternatively, the amount of the allocated radio resources may be the remaining amount of the radio resources that is obtained by subtracting the total of the amounts of the radio resources that are allocated to the user terminals currently connected from the amount of the radio resources that can be used by the second base station 200. It may be suitably set as to what amount is set to be the amount of the allocated radio resources. In the embodiment, for example, a case is explained where the amount of the allocated radio resources is the total of the amounts of the radio resources that are allocated to the user terminals currently connected.

Radio resources include a CQI resource utilization rate, a scheduling request resource utilization rate, a sounding reference signal resource utilization rate, a base band utilization rate, and transmission power, for example.

Resources other than the radio resources include a CPU utilization rate and a transmission path utilization rate.

A threshold value of the radio resources (hereinafter, which is referred to as "the radio resource amount threshold value") is set for the second base station. Here, the radio resource amount threshold value may be an amount of the radio resources for determining to disconnect a call with an unregistered user terminal, or the radio resource amount threshold value may be an amount obtained by adding a predetermined margin to the amount of the radio resources or by subtracting a predetermined margin from the amount of the radio resources.

The second base station 200 determines whether the amount of the allocated resources is greater than or equal to the radio resource amount threshold value.

When the amount of the allocated radio resource is greater than or equal to the radio resource amount threshold value, the second base station 200 disconnects the call with the unregistered user terminal. When the amount of the allocated radio resources is less than the radio resource amount threshold value, the second base station 200 determines not to disconnect the call with the unregistered user terminal.

By determining whether to disconnect the call with the unregistered user terminal based on the radio resource amount threshold value, the radio resources can be ensured for the registered user terminals. That is because the call with the unregistered user terminal is disconnected when the radio resources are not ensured.

For disconnecting the call with the unregistered user terminal, the second base station 200 selects the unregistered user terminal with which the call is to be disconnected in accordance with the priority below.

<Unregistered User Terminal Selection Method (Version 1)>

The second base station 200 selects the unregistered user terminal to be disconnected based on connection time periods. For example, the unregistered user terminals may be selected in a descending order of the connection time periods. For selecting the unregistered user terminals in the descending order of the connection time periods, a user terminal may be excluded from the selection if data addressed to the user terminal is stored. Alternatively, user terminals may be selected regardless of whether data addressed to the user terminals is stored.

<Unregistered User Terminal Selection Method (Version 2)>

The second base station 200 may select unregistered user terminals in a descending order of time periods in which data is not stored in buffers corresponding to the unregistered user terminals. For example, user terminals for which the calls are to be disconnected may be selected in a descending order of non-communication time periods, in which there is no data to be transmitted. For example, the second base station 200 may select unregistered user terminals in a descending order of the elapsed time periods of the corresponding UE inactive timers. In order to prevent a call with an unregistered user terminal from being disconnected, for which the UE inactive timer is accidentally activated, a threshold value is preferably defined. The threshold value may be a lower limit of the elapsed time period. In this case, unregistered user terminals are selected in a descending order of the elapsed time periods of the corresponding UE inactive timers, among the user terminals for which the elapsed time periods are greater than or equal to the threshold value, which may be the lower limit of the elapsed time period. In a state where a user terminal is connected to a core network, if there is no data for the user terminal, the UE inactive timer is activated. For an unregistered user terminal for which time is very long, during which no data is stored in a buffer corresponding to the unregistered user terminal, an impact is assumed to be small even if the call is disconnected, compared to an unregistered user terminal for which the time is very short, during which no data is stored in a buffer. Alternatively, unregistered user terminals may be selected in a descending order of time periods in which there is no uplink data.

<Unregistered User Terminal Selection Method (Version 3)>

A threshold value of time in which no data is stored in a buffer corresponding to a user terminal (hereinafter, which is referred to as "the data unstored time threshold value") may be defined for the base station 200. The data unstored time threshold value may be set so that a call is released when the data unstored time threshold value has elapsed.

In the second base station 200, the threshold value for an unregistered user terminal may be set to be less than the threshold value for a registered user terminal, so that the unregistered user terminal is to be selected. For example, in the second base station 200, the data unstored time threshold value may be set to be the threshold value for the UE inactive timer. In a state where a user terminal is connected to a core network, if there is no data for the user terminal, the UE inactive timer is activated. For an unregistered user terminal for which time, in which no data is stored in a buffer corresponding to the unregistered user terminal, is greater than the data unstored time threshold value, an impact is assumed to be small even if the call is disconnected, compared to an unregistered user terminal for which the time is less than the data unstored time threshold value.

<Unregistered User Terminal Selection Method (Version 4)>

The second base station 200 may unconditionally disconnect all the calls of unregistered user terminals.

Alternatively, unregistered user terminals to be disconnected may be selected by suitably combining the unregistered user terminal selection method (version 1) through the unregistered user terminal selection method (version 4). For example, calls are disconnected by selecting the unregistered user terminals in the descending order of the elapsed time periods of the corresponding UE inactive timers, among the unregistered user terminals for which the elapsed time periods are greater than or equal to the threshold value, in accordance with the unregistered user terminal selection method (version 2). However, when the radio resources are insufficient, unregistered user terminals may be selected in accordance with the unregistered user terminal selection method (version 1). Alternatively, all the unregistered user terminals may be unconditionally disconnected, in accordance with the unregistered user terminal selection method (version 4). Further, the second base station 200 may control a ratio between the amount of the radio resources to be allocated to the registered user terminals and the amount of the radio resources to be allocated to the unregistered user terminals, depending on the amount of the allocated radio resources.

For example, when the amount of the allocated radio resources is small, the amount of the radio resources to be allocated to the registered user terminals and the amount of the radio resources to be allocated to the unregistered user terminals are set to be a predetermined ratio. For example, the ratio between the amount of the radio resources to be allocated to the registered user terminals and the amount of the radio resources to be allocated to the unregistered user terminals may be set to be (1:1).

Further, when the amount of the allocated radio resources increases, the control is performed so that the registered user terminals are prioritized by increasing the ratio of the amount of the radio resources to be allocated to the registered user terminals. For example, the ratio between the amount of the radio resources to be allocated to the registered user terminals and the amount of the radio resources to be allocated to the unregistered user terminals may be set to be 7:3.

When the amount of the allocated radio resources further increases, the control is performed, so that the registered user terminals are prioritized, by further increasing the ratio of the amount of the radio resources to be allocated to the registered user terminals. For example, the ratio between the amount of the radio resources to be allocated to the registered user terminals and the amount of the radio resources to be allocated to the unregistered user terminals may be set to be 8:2.

By increasing the ratio of the amount of the radio resources to be allocated to the registered user terminals, in accordance with the increase in the amount of the allocated radio resources, throughputs of the registered terminals may be prevented from being lowered when the number of the connected user terminals increases.

The second base station 200 according to the embodiment is explained by the functional block diagram shown in FIG. 5. The second base station 200 according to the embodiment is different from the second base station 200 explained by referring to FIG. 5 in the function of the controller 206 and in the information stored in the managing unit 210.

The managing unit 210 manages the setting information for accepting the call connection request from the user terminal 300. The setting information includes the radio resource amount threshold value. Additionally, the setting information includes the threshold value, which is to be the lower limit of the elapsed time period, for a case where the unregistered user terminal selection method (version 2) is applied, and the setting information includes the data unstored time threshold value for a case where the unregistered user terminal selection method (version 3) is applied.

Figure 11:
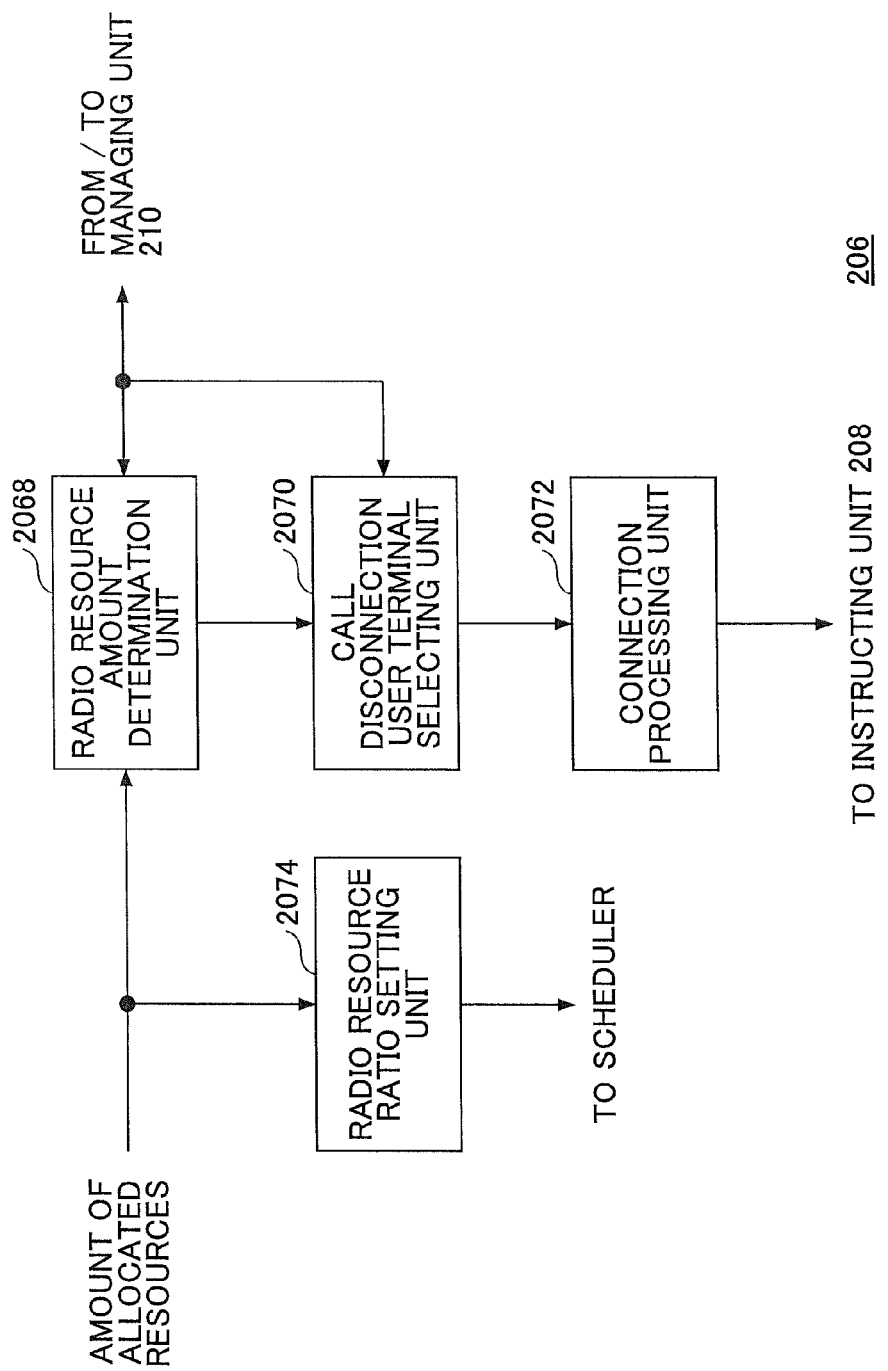
FIG. 11 is a functional block diagram showing an example of the base station according to the embodiment.

FIG. 11 shows the functions of the controller 206.

The controller 206 includes a radio resource amount determination unit 2068. The amount of the allocated radio resources is input to the radio resource amount determination unit 2068. It may be input periodically, or nonperiodically. The radio resource amount determination unit 2068 determines whether the amount of the allocated radio resources is greater than or equal to the radio resource amount threshold value to be input to the managing unit 210. When the amount of the allocated radio resources is greater than or equal to the radio resource amount threshold value, the radio resource determination unit 206 determines that the radio resources are insufficient. When the amount of the allocated radio resources is less than the radio resource amount threshold value, the radio resource determination unit 206 determines that the radio resources are sufficient. The radio resource amount determination unit 2068 inputs information indicating whether the radio resources are insufficient to a call disconnection user terminal selecting unit 2070.

The controller 206 includes the call disconnection user terminal selecting unit 2070. The call disconnection user terminal selecting unit 2070 is connected to the radio resource amount determination unit 2068. When the information indicating whether the radio resources are insufficient to be input by the radio resource amount determination unit 2068 is information indicating that the radio resources are insufficient, the call disconnection user terminal selecting unit 2070 selects a user terminal with which a call is to be disconnected. For example, the call disconnection user terminal selecting unit 2070 may select an unregistered user terminal to be disconnected in accordance with the unregistered user terminal selection method (version 1). The call disconnection user terminal selecting unit 2070 may select an unregistered user terminal to be disconnected in accordance with the unregistered user terminal selection method (version 2). The call disconnection user terminal selecting unit 2070 may select an unregistered user terminal to be disconnected in accordance with the unregistered user terminal selection method (version 3). Further, in accordance with the unregistered user terminal selection method (version 3), all the unregistered user terminals may be selected. Further, it may be selected by suitably combining them. The call disconnection user terminal selecting unit 2070 inputs information indicating the unregistered user terminal to be disconnected to a connection processing unit 2072.

The controller 206 includes the connection processing unit 2072. The connection processing unit 2072 is connected to the call disconnection user terminal selecting unit 2070. The connection processing unit 2072 performs a process of disconnecting a call with an unregistered user terminal to be disconnected, based on the information indicating the unregistered user terminal to be disconnected, which is input by the call disconnection user terminal selecting unit 2070. For example, the connection processing unit 2072 instructs the instructing unit 208 to transmit the UE Context Release Request (the line opening request signal) to the MME. Further, after receiving the UE Context Release Request (the line opening request signal) from the MME, the connection processing unit 2072 instructs the instructing unit 208 to transmit the RRC Connection Release (the line opening command signal) to the unregistered user terminal to be disconnected.

The controller 206 includes a radio resource ratio setting unit 2074. Information indicating the amount of the allocated radio resources is input to the radio resource ratio setting unit 2074. The radio resource ratio setting unit 2074 controls the ratio between the amount of the radio resources to be allocated to the registered user terminals and the amount of the radio resources to be allocated to the unregistered user terminals, depending on the amount of the allocated radio resources. The radio resource ratio setting unit 2074 inputs information indicating the ratio between the amount of the radio resources to be allocated to the registered user terminals and the amount of the radio resources to be allocated to the unregistered user terminals to a scheduler (not shown). Based on the information input by the radio resource ratio setting unit 2074, the scheduler performs scheduling for selecting user terminals to which the radio resources are allocated.

<Operations of the System>

Figure 12:
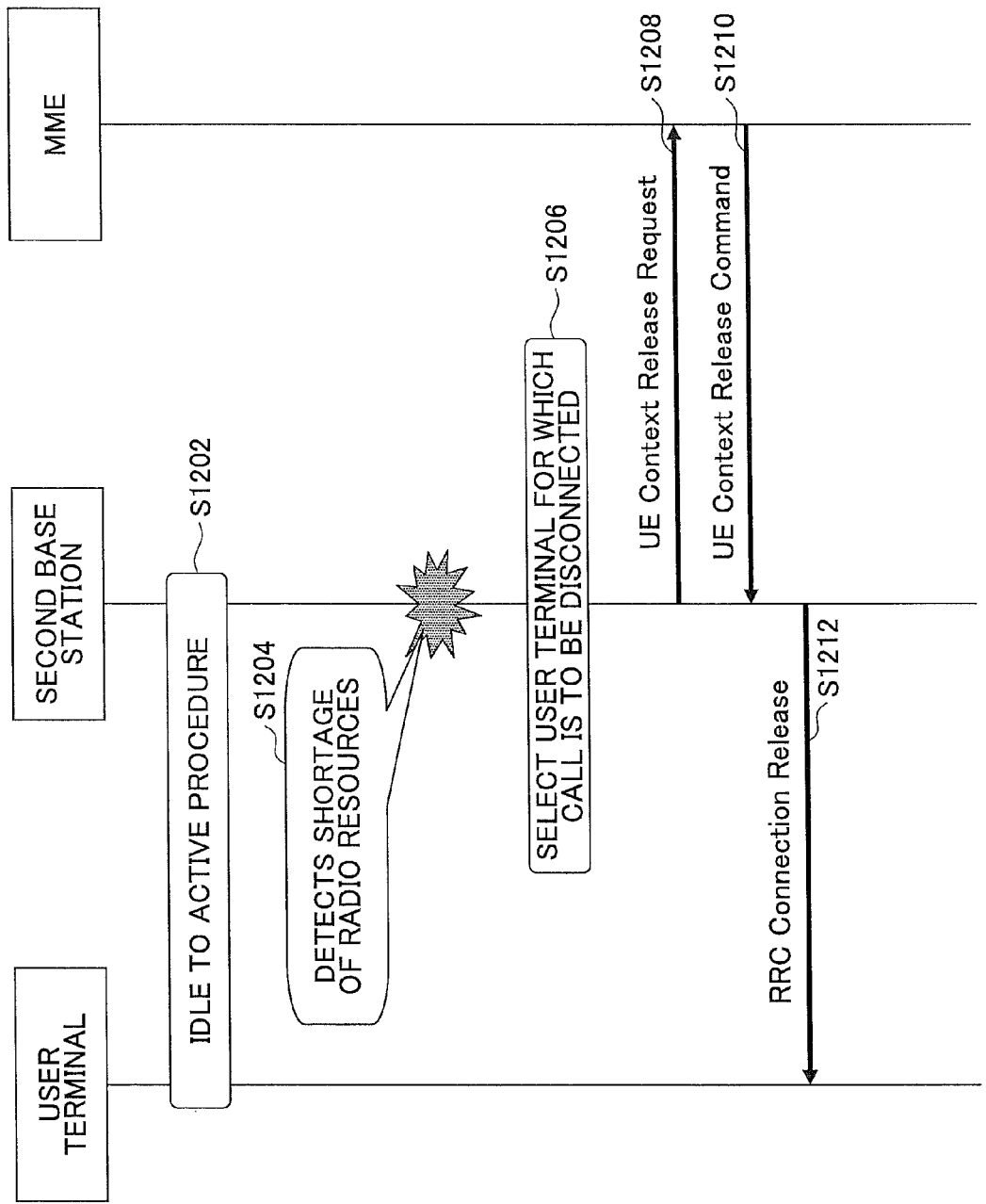
FIG. 12 is a sequence chart showing an example of operations of the system according to the embodiment.

FIG. 12 is a sequence chart showing operations of the system.

In the example shown in FIG. 12, the user terminal 300 is an unregistered user terminal, and a case is explained where the unregistered user terminal is selected as the user terminal for which a call is to be disconnected.

The RRC Connection setting is established between the user terminal 300 and the second base station 200, and a state transition from an idle state to an active state is performed in the user terminal 300 (step S1202).

The second base station 200 controls the ratio between the amount of the radio resources to be allocated to the registered user terminals and the amount of the radio resources to be allocated to the unregistered user terminals, depending on the amount of the allocated radio resources.

The second base station 200 detects that the amount of the radio resources is insufficient (step S1204). For example, the radio resource amount determination unit 2068 determines whether the amount of the allocated radio resources is greater than or equal to the radio resource amount threshold value. When the amount of the allocated radio resources is greater than or equal to the radio resource amount threshold value, the radio resource amount determination unit 2068 determines that the amount of the radio resources is insufficient. When the amount of the allocated radio resources is less than the radio resource amount threshold value, the radio resource amount determination unit 2068 determines that the amount of the radio resources is sufficient.

For a case where the amount of the radio resources is determined to be insufficient, the unregistered user terminal for which a call is to be disconnected is selected (step S1206). For example, the call disconnection user terminal selecting unit 2070 selects the unregistered user terminal for which the call is to be disconnected. For example, it is selected by any one of <Unregistered user terminal selection method (version 1)> to <Unregistered user terminal selection method (version 4)>, or by a method in which these are suitably combined.

In order to disconnect the call with the unregistered user terminal selected at step S1206, the second base station 200 transmits the UE Context Release Request (the line opening request signal) to the MME (step S1208). For example, the connection processing unit 2072 instructs the instructing unit 208 to generate the UE Context Release Request. The instructing unit 208 generates the UE Context Release Request in accordance with the instruction by the connection processing unit 2072, and the instructing unit 208 inputs the UE Context Release Request to the uplink signal transmitter 204. The uplink signal transmitter 204 transmits the UE Context Release Request to the MME.

The MME transmits the UE Context Release Command (the line opening command signal) to the second base station 200 (step S1210).

The second base station 200 wirelessly transmits the RRC Connection Release (the line opening command signal) to the user terminal 300 (step S1212). For example, the connection processing unit 2072 instructs the instructing unit 208 to generate the RRC Connection Release. The instructing unit 208 generates the RRC Connection Release in accordance with the instruction by the connection processing unit 2072, and the instructing unit 208 inputs the RRC Connection Release to the downlink signal transmitter 212. The downlink signal transmitter 212 wirelessly transmits the RRC Connection Release to the user terminal 300.

In the embodiment, when the first base station determines to cause the user terminal 300 to perform a handover to the second base station, processes similar to the above-described processes may be performed. For example, the second base station that receives an initial connection request from the user terminal 300 determines whether the user terminal 300 is a registered user terminal. When the user terminal 300 is determined to be the registered user terminal and the amount of the radio resources is determined to be insufficient, a user terminal to be disconnected may be selected among unregistered user terminals currently connected.

According to the embodiment, for a case where the second base station is set to be accessible to registered user terminals and unregistered user terminals, the radio resources can be ensured for the registered user terminals. Since the radio resources are ensured, throughputs in the registered user terminals can be increased. In addition, the probability of successfully establishing a connection with the registered user terminal can be increased. Further, the probability of successfully performing a handover can be increased for the registered user terminal.

According to the embodiment, it is expected that throughputs are increased for the unregistered user terminals, provided that the radio resources are ensured.

Modified Example

<System>

An environment to which a base station according to the modified example is applied is the same as the environment explained by referring to FIG. 1.

<First Base Station>

The first base station 100 is the same as the first base station according to the above-described embodiment.

<Second Base Station>

The second base station 200 is different from the second base station according to the above described-embodiments in the determination method for determining whether to accept a call from the user terminal 300. In other words, it is different in the method of determining whether the amount of the radio resources is insufficient.

The second base station 200 determines whether to disconnect a call with an unregistered user terminal, depending on the number of the user terminals being in the RRC Connected states with the second base station 200 (hereinafter, which is referred to as "the number of the connected user terminals"). In other words, the number of the connected user terminals is used as an index representing the amount of the allocated radio resources. Here, the user terminals included in the number of the connected user terminals may be unregistered user terminals. Alternatively, the user terminals included in the number of the connected user terminals may be unregistered user terminals and registered user terminals.

The second base station 200 includes a threshold value for the number of the connected user terminals (hereinafter, which is referred to as "the connected user terminal number threshold value"). The connected user terminal number threshold value may be the number of the connected user terminals with which a call with an unregistered user terminal is determined to be disconnected. Alternatively, the connected user terminal number threshold value may be the number obtained by adding a predetermined margin to the number of the connected user terminals or by subtracting a predetermined margin from the number of the connected user terminals. The second base station 200 determines whether the number of the connected user terminals is greater than or equal to the connected user terminal number threshold value. When the number of the connected user terminals is greater than or equal to the connected user terminal number threshold value, the second base station 200 disconnects the call with the unregistered user terminal. When the number of the connected user terminals is less than the connected user terminal number threshold value, the second base station 200 determines not to disconnect the call with the unregistered user terminal.

By determining whether to disconnect the call with the unregistered user terminal based on the connected user terminal number threshold value, the connection with the unregistered user terminal is disconnected when the radio resources are not ensured. Accordingly, the radio resources are ensured for the registered user terminals.

For disconnecting the call with the unregistered user terminal, the second base station 200 selects the unregistered user terminal to be disconnected according to any of <Unregistered user terminal selection method (version 1)> through <Unregistered user terminal selection method (version 4)> or a suitable combination of these.

Further, the second base station 200 may control the ratio between the amount of the radio resources to be allocated to the registered user terminals and the amount of the radio resources to be allocated to the unregistered user terminals, depending on the number of the connected user terminals.

For example, when the number of the connected user terminals is small, the amount of the radio resources to be allocated to the registered user terminals and the amount of the radio resources to be allocated to the unregistered user terminals are set by a predetermined ratio. For example, the ratio between the amount of the radio resources to be allocated to the registered user terminals and the amount of the radio resources to be allocated to the unregistered user terminals may be set to be (1:1).

When the number of the connected user terminals further increases, the control is performed so as to prioritize the registered user terminals by increasing the ratio of the radio resources to be allocated to the registered user terminals. For example, the ratio between the amount of the radio resources to be allocated to the registered user terminals and the amount of the radio resources to be allocated to the unregistered user terminals may be set to be 7:3.

When the number of the connected user terminals further increases, the control is performed so as to prioritize the registered user terminals by further increasing the ratio of the radio resources to be allocated to the registered user terminals. For example, the ratio between the amount of the radio resources to be allocated to the registered user terminals and the amount of the radio resources to be allocated to the unregistered user terminals may be set to be 8:2.

By increasing the ratio of the radio resources to be allocated to the registered user terminals in accordance with the increase in the number of the user terminals, throughputs of the registered user terminals may be prevented from being lowered when the number of the connected user terminals increases.

The second base station 200 according to the embodiment is explained by a functional block diagram shown in FIG. 5. The second base station 200 is different from the second base station 200 explained by referring to FIG. 5 in the functions of the controller 206 and the information stored in the managing unit 210.

The managing unit 210 manages the setting information to be set with user terminals. The setting information includes the connected user terminal number threshold value. Further, the setting information includes the threshold value to be the lower limit of the elapsed time period, which is for a case where the unregistered user terminal selection method (version 2) is applied, and the setting information includes the data unstored time threshold value, which is for a case where the unregistered user terminal selection method (version 3) is applied.

Figure 13:
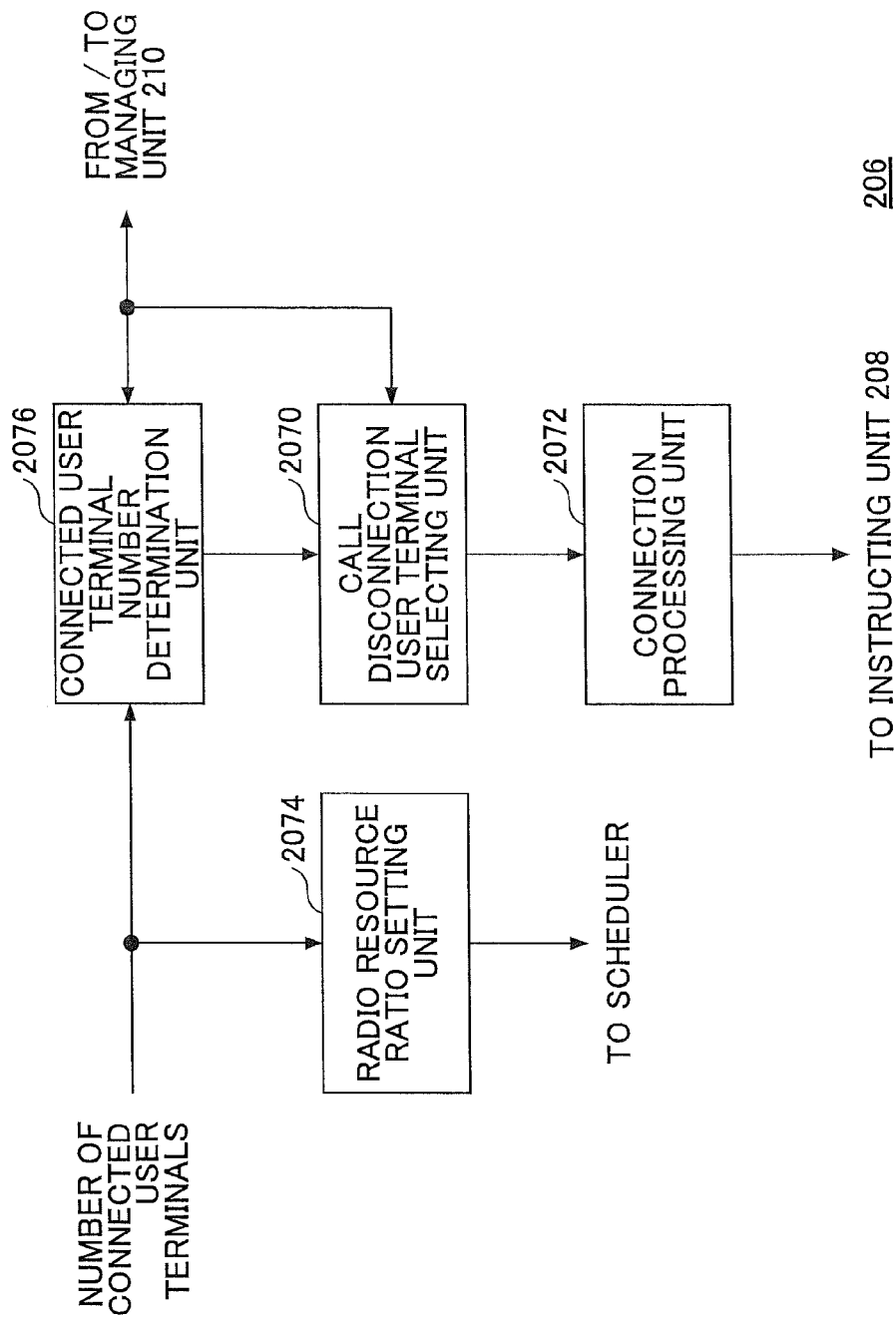
FIG. 13 is a functional block diagram showing an example of the base station according to the embodiment.

FIG. 13 shows the functions of the controller 206.

The controller 206 includes a connected user terminal number determination unit 2076. The number of the connected user terminals is input to the connected user terminal determination unit 2076. It may be periodically input, or nonperiodically input. The connected user terminal number determination unit 2076 determines whether the number of the connected user terminals is greater than or equal to the connected user terminal number threshold value to be stored in the managing unit 210. When the number of the connected user terminals is greater than or equal to the connected user terminal number threshold value, the connected user terminal number determination unit 2076 determines that the amount of the radio resources is insufficient. When the number of the connected user terminals is less than the connected user terminal number threshold value, the connected user terminal number determination unit 2076 determines that the amount of the radio resources is sufficient. The connected user terminal number determination unit 2076 inputs information indicating whether the amount of the radio resources is insufficient to the call disconnection user terminal selecting unit 2070.

The call disconnection user terminal selecting unit 2070 is connected to the connected user terminal number determination unit 2076. When the information indicating whether the amount of the radio resources is insufficient, which is to be input by the connected user terminal number determination unit 2076, is information indicating that the amount of the radio resources is insufficient, the call disconnection user terminal selecting unit 2070 selects the user terminal for which the call is to be disconnected. For example, the call disconnection user terminal selecting unit 2070 may select the unregistered user terminal to be disconnected in accordance with the unregistered user terminal selection method (version 1). The call disconnection user terminal selecting unit 2070 may select the unregistered user terminal to be disconnected in accordance with the unregistered user terminal selection method (version 2). The call disconnection user terminal selecting unit 2070 may select the unregistered user terminal to be disconnected in accordance with the unregistered user terminal selection method (version 3). Furthermore, the unregistered user terminal to be disconnected may be selected in accordance with the unregistered user terminal selection method (version 4). Further, it may be selected by suitably combining these. The call disconnection user terminal selecting unit 2070 inputs the information representing the unregistered user terminal for which the call is to be disconnected to the connection processing unit 2072.

The connection processing unit 2072 performs a process for disconnecting a call with the unregistered user terminal for which the call is to be disconnected, based on the information (which is input from the call disconnection user terminal selecting unit 2070) representing the unregistered user terminal for which the call is to be disconnected. For example the connection processing unit 2072 instructs the instructing unit 208 to transmit the UE Context Release Request to the MME. Further, after receiving the UE Context Release Request from the MME, the connection processing unit 2072 instructs the instructing unit 208 to transmit the RRC Connection Release to the unregistered user terminal for which the call is to be disconnected.

Information representing the number of the connected user terminals is input to the radio resource ratio setting unit 2074. The radio resource ratio setting unit 2074 controls the ratio between the amount of the ratio resources to be allocated to the registered user terminals and the amount of the radio resources to be allocated to the unregistered user terminals, depending on the number of the connected user terminals. The radio resource ratio setting unit 2074 inputs information representing the ratio between the amount of the radio resources to be allocated to the registered user terminals and the amount of the radio resources to be allocated to the unregistered user terminals to a scheduler (not shown). The scheduler performs scheduling for selecting the user terminal to which the radio resources are allocated, based on the information input by the radio resource ratio setting unit 2074.

<Operations of the System>

The operations of the system are different from the sequence chart explained by referring to FIG. 12 in the process at step S1204.

At step S1204, the second base station 200 detects that the amount of the radio resources is insufficient. For example, the connected user terminal number determination unit 2076 determines whether the number of the connected user terminals is greater than or equal to the connected user terminal number threshold value. When the number of the connected user terminals is greater than or equal to the connected user terminal number threshold value, the connected user terminal number determination unit 2076 determines that the amount of the radio resources is insufficient. When the number of the connected user terminals is less than the connected user terminal number threshold value, the connected user terminal number determination unit 2076 determines that the amount of the radio resources is sufficient.

In the embodiment, when the first base station determines to cause the user terminal 300 to perform a handover to the second base station, processes similar to the above-described processes may be performed. For example, the second base station that receives an initial connection request from the user terminal 300 determines whether the user terminal 300 is a registered user terminal. When the user terminal 300 is determined to be the registered user terminal and the amount of the radio resources is determined to be insufficient, the user terminal to be disconnected may be selected among the unregistered user terminals currently connected.

According to the modified example, when the second base station is set to be accessible to the registered user terminals and unregistered user terminals, the radio resources may be ensured for the registered user terminals. The number of the connected user terminals is used as an index for determining whether the radio resources can be ensured. Since the radio resources are ensured, throughputs of the registered user terminals can be increased. Further, the probability of successfully establishing connections with the registered user terminals can be increased. Further, the probability of successfully performing handovers can be increased for the registered user terminals.

According to the modified example, it is expected that throughputs may be increased for the unregistered user terminals, provided that the radio resources are ensured.

The base station is a base station that performs radio communication with a user terminal. The base station includes a call connection acceptance determination unit that determines, when a call connection request signal from the user terminal is received, whether a call connection request from the user terminal is acceptable, based on an amount of resources that is used by the base station; a redirection-setting unit that sets, when the call connection acceptance determination unit determines that the call connection request from the user terminal is not to be accepted, a different base station to which the user terminal is to be redirected; and a notification unit that reports information representing the different base station that is set by the redirection-setting unit to the user terminal.

Further, the redirection-setting unit may set, as the different base station to which the user terminal is to be redirected, a macro base station that covers a portion of a cell, the cell being covered by the base station.

Further, a user terminal registration unit that registers the user terminal; and a user terminal determination unit that determines whether the user terminal that transmits the call connection request is registered in the user terminal registration unit may be included. The call connection acceptance determination unit may accept the call connection request from the user terminal that is determined to be registered by the user terminal determination unit, and the call connection acceptance determination unit may determine the amount of the resources that is used by the base station, based on a threshold value of the amount of the resources for determining not to accept the call connection request from the user terminal that is determined not to be registered.

Further, the user terminal registration unit that registers the user terminal; and the user terminal determination unit that determines whether the user terminal that transmits the call connection request is registered in the user terminal registration unit may be included. The call connection acceptance determination unit may determine whether to accept a connection request of the user terminal that transmits the call connection request, based on a first resource amount threshold value corresponding to the amount of the resources for determining whether the call connection request from the user terminal registered in the user terminal registration unit is to be accepted, a second resource amount threshold value corresponding to the amount of the resources for determining whether the call connection request from the user terminal not registered in the user terminal registration unit is to be accepted, and a determination result of the user terminal determination unit.

Further, the user terminal registration unit that registers the user terminal; and the user terminal determination unit that determines whether the user terminal that transmits the call connection request is registered in the user terminal registration unit may be included. The call connection acceptance determination unit may determine whether to accept the call connection request from the user terminal that transmits the call connection request, based on a first user terminal number threshold value corresponding to a first number of user terminals that are registered in the user terminal registration unit, a second user terminal number threshold value corresponding to a second number of user terminals that are not registered in the user terminal registration unit, and the determination result of the user terminal determination unit.

Further, the notification unit may cause the information representing the different base station that is set by the redirection-setting unit to be included in a line opening command signal.

Further, the resources may include at least one of a CQI resource utilization rate; a scheduling request resource utilization rate; a sounding reference signal resource utilization rate; a base band utilization rate; transmission power; a CPU utilization rate; and a transmission path utilization rate.

The radio communication system is a radio communication system including a user terminal; and a base station that performs radio communication with the user terminal. The base station includes a call connection acceptance determination unit that determines, when a call connection request signal from the user terminal is received, whether a call connection request from the user terminal is acceptable, based on an amount of resources that is used by the base station; a redirection-setting unit that sets, when the call connection acceptance determination unit determines that the call connection request from the user terminal is not to be accepted, a different base station to which the user terminal is to be redirected; and a notification unit that reports information representing the different base station that is set by the redirection-setting unit to the user terminal. The user terminal includes a connection processing unit that performs a call connection process with the base station. When the base station reports the information representing the different base station, the connection processing unit performs redirection to the different base station.

The communication method is a method of a base station that performs radio communication with a user terminal. The communication method includes a call connection acceptance determination step of determining, when a call connection request signal from the user terminal is received, whether a call connection request from the user terminal is acceptable, based on an amount of resources that is used by the base station; a redirection-setting step of setting, when the call connection acceptance determination step determines that the call connection request from the user terminal is not to be accepted, a different base station to which the user terminal is to be redirected; and a notification step of reporting information representing the different base station that is set by the redirection-setting step to the user terminal.

The base station is a base station that performs radio communication with a user terminal.

The base station includes a user terminal registration unit that registers first user terminals; a connection processing unit that performs connection processes between the first user terminals that are registered in the user terminal registration unit and the base station, and between second user terminals other than the first user terminals that are registered in the user terminal registration unit and the base station; a resource amount measurement unit that measures an amount of resources that is used by the base station; and a call disconnection user terminal selecting unit that selects, when the resource amount measurement unit measures that the amount of the resources that is used by the base station is greater than or equal to a predetermined threshold value, the second user terminal for which a call is to be disconnected, among the second user terminals other than the first user terminals that are registered in the user terminal registration unit. The connection processing unit disconnects a connection with the second user terminal for which the call is to be disconnected, the second user terminal being selected by the call disconnection user terminal selecting unit.

Further, the call disconnection user terminal selecting unit may select user terminals for which corresponding calls are to be disconnected in a descending order of connection time periods.

Further, the call disconnection user terminal selecting unit may select user terminals for which corresponding calls are to be disconnected in a descending order of non-communication time periods in which there is no data to be transmitted.

Further, a call release time threshold value setting unit may be included. The call release time threshold value setting unit sets, when the resource amount measurement unit determines that the amount of the resources used by the base station is greater than or equal to the predetermined threshold value, a first threshold value for the second user terminal other than the first user terminals that are registered in the user terminal registration unit to be a small value among second threshold values representing the non-communication time periods until corresponding calls are released. The second threshold values are to be set for the corresponding user terminals. The call connection processing unit may disconnect the call with the second user terminal for which the non-communication time period reaches the first threshold value that is set in the call release time threshold value setting unit.

Further, the call disconnection user terminal selecting unit may select all the second user terminals other than the first user terminals that are registered in the user terminal registration unit.

Further, a resource ratio setting unit may be included. The resource ratio setting unit sets a ratio between a first amount of the resources that is to be used by the first user terminals that are registered in the user terminal registration unit and a second amount of the resources that is to be used by the second user terminals other than the first user terminals that are registered in the user terminal registration unit, based on the amount of the resources that can be used by the base station.

Further, the resources may include at least one of a CQI resource utilization rate; a scheduling request resource utilization rate; a sounding reference signal resource utilization rate; a base band utilization rate; transmission power; a CPU utilization rate; and a transmission path utilization rate.

Further, the communication method is a communication method of a base station that performs radio communication with a user terminal. The communication method includes a user terminal registration step of registering first user terminals; a connection processing step of performing connection processes between the first user terminals that are registered by the user terminal registration step and the base station, and between second user terminals other than the first user terminals that are registered by the user terminal registration step and the base station; a resource amount measurement step of measuring an amount of resources that is used by the base station; a call disconnection user terminal selecting step of selecting, when the resource amount measurement step measures that the amount of the resources that is used by the base station is greater than or equal to a predetermined threshold value, the second user terminal for which a call is to be disconnected, among the second user terminals other than the first user terminals that are registered in the user terminal registration unit; and a call disconnecting step of disconnecting a connection with the second user terminal for which the call is to be disconnected, the second user terminal being selected by the call disconnection user terminal selecting step.

For convenience of the explanations, specific examples of numerical values are used, in order to facilitate understanding of the invention. However, these numerical values are simply illustrative, and any other appropriate values may be used, except as indicated otherwise.

Hereinabove, the present invention is explained while referring to specific embodiments. However, the embodiments are simply illustrative, and various variations, modifications, alterations, substitutions and so on could be conceived by those skilled in the art. For convenience of the explanations, devices according to the embodiments of the present invention are explained by using the functional block diagrams. However, these devices may be implemented in hardware, software, or combinations thereof. The present invention is not limited to the above-described embodiments, and various variations, modifications, alterations, substitutions and so on are included, without departing from the spirit of the present invention.

LIST OF REFERENCE SYMBOLS

100: First base station
150: Cell of the first base station
200: Second base station
202: Downlink signal receiver
204: Uplink signal transmitter
206: Controller
2062: User terminal determination unit
2064: Call connection acceptance determination unit
2066: Redirection determination unit
2068: Radio resource amount determination unit
2070: Call disconnection user terminal selecting unit
2072: Connection processing unit
2074: Radio resource ratio setting unit
2076: Connected user terminal number determination unit
208: Instructing unit
210: Managing unit
212: Downlink signal transmitter
214: Uplink signal receiver
250: Cell of the second base station
300: User terminal
302: Connection processing unit

The invention claimed is:

1. A base station that performs radio communication with a user terminal, the base station comprising:
   a user terminal registration unit that registers first user terminals;
   a connection processing unit that performs connection processes between the first user terminals that are registered in the user terminal registration unit and the base station, and between second user terminals other than the first user terminals that are registered in the user terminal registration unit and the base station;
   a resource amount measurement unit that measures an amount of resources that is utilized by the base station; and
   a call disconnection user terminal selecting unit that selects, when the resource amount measurement unit measures that the amount of the resources that is used by the base station is greater than or equal to a resource amount threshold value, the second user-terminals for which calls are to be disconnected in a descending order of connection time periods, among the second user terminals other than the first user terminals that are registered in the user terminal registration unit,
   wherein the connection processing unit disconnects connections with the second user terminals for which the calls are to be disconnected, the second user terminals being selected by the call disconnection user terminal selecting unit.

2. The base station according to claim 1,
   wherein the call disconnection user terminal selecting unit selects the second user terminals for which corresponding calls are to be disconnected in a descending order of non-communication time periods in which there is no data to be transmitted.

3. The base station according to claim 1, further comprising:
   a call release time threshold value setting unit that sets, when the resource amount measurement unit determines that the amount of the resources utilized by the base station is greater than or equal to the resource amount threshold value, first threshold values for the corresponding second user terminals other than the first user terminals that are registered in the user terminal registration unit to be small values among second threshold values representing non-communication time periods until corresponding calls are released, wherein the second threshold values are to be set for the corresponding first and second user terminals,
   wherein the call connection processing unit disconnects the call with the second user terminal for which the non-communication time period reaches the first threshold value that is set in the call release time threshold value setting unit.

4. The base station according to claim 1, further comprising:
a resource ratio setting unit that sets a ratio between a first amount of the resources that is to be used by the first user terminals that are registered in the user terminal registration unit and a second amount of the resources that is to be used by the second user terminals other than the first user terminals that are registered in the user terminal registration unit, based on the amount of the resources that can be used by the base station.

5. The base station according to claim 1,
wherein the resources include at least one of a Channel Quality Indicator (CQI) resource utilization rate; a scheduling request resource utilization rate; a sounding reference signal resource utilization rate; a base band utilization rate; transmission power; a CPU utilization rate; and a transmission path utilization rate.

6. A communication method of a base station that performs radio communication with a user terminal, the communication method comprising:
a user terminal registration step of registering first user terminals;
a connection processing step of performing connection processes between the first user terminals that are registered by the user terminal registration step and the base station, and between second user terminals other than the first user terminals that are registered by the user terminal registration step and the base station;
a resource amount measurement step of measuring an amount of resources that is used by the base station;
a call disconnection user terminal selecting step of selecting, when the resource amount measurement step measures that the amount of the resources that is used by the base station is greater than or equal to a resource amount threshold value, the second user-terminals for which calls are to be disconnected in a descending order of connection time periods, among the second user terminals other than the first user terminals that are registered in the user terminal registration unit; and
a call disconnecting step of disconnecting connections with the second user terminals for which the calls are to be disconnected, the second user terminals being selected by the call disconnection user terminal selecting step.

* * * * *